US010572556B2

(12) United States Patent
Reznik

(10) Patent No.: US 10,572,556 B2
(45) Date of Patent: Feb. 25, 2020

(54) SYSTEMS AND METHODS FOR FACILITATING ENHANCEMENTS TO SEARCH RESULTS BY REMOVING UNWANTED SEARCH RESULTS

(71) Applicant: Alan Mark Reznik, Milford, CT (US)

(72) Inventor: Alan Mark Reznik, Milford, CT (US)

(*) Notice: Subject to any disclaimer, the term of this patent is extended or adjusted under 35 U.S.C. 154(b) by 322 days.

(21) Appl. No.: 14/719,315

(22) Filed: May 21, 2015

(65) Prior Publication Data

US 2015/0294014 A1    Oct. 15, 2015

Related U.S. Application Data

(63) Continuation of application No. 13/326,593, filed on Dec. 15, 2011, now abandoned.

(60) Provisional application No. 61/481,236, filed on May 1, 2011.

(51) Int. Cl.
*G06F 16/9535* (2019.01)
*G06F 16/248* (2019.01)
*G06F 16/2457* (2019.01)

(52) U.S. Cl.
CPC ........ *G06F 16/9535* (2019.01); *G06F 16/248* (2019.01); *G06F 16/24578* (2019.01)

(58) Field of Classification Search
CPC ......... G06F 17/30864; G06F 17/30867; G06F 17/30553; G06F 17/3053; G06F 17/30554; G06F 16/9535; G06F 16/24578; G06F 16/951; G06F 16/248
See application file for complete search history.

(56) References Cited

U.S. PATENT DOCUMENTS

| | | |
|---|---|---|
| 4,504,907 A | 3/1985 | Manning et al. |
| 5,247,627 A | 9/1993 | Murakami et al. |
| 5,454,105 A | 9/1995 | Hatakeyama et al. |
| 5,894,462 A | 4/1999 | Hwangbo |
| 5,982,369 A | 11/1999 | Sciammarella et al. |
| 5,991,721 A | 11/1999 | Asano et al. |
| 5,999,653 A | 12/1999 | Rucklidge et al. |
| 6,055,535 A | 4/2000 | Suzuoka et al. |

(Continued)

FOREIGN PATENT DOCUMENTS

WO        0077689 A1    12/2000

OTHER PUBLICATIONS

Franciso Tanudjaja, and Lik Mui: "Persona: A Contextualized and Personalized Web Search", Laboratory of Computer Science at MIT, Cambridge, MA 02139; dated Jun. 1, 2001; Annual Hawaii International Conference on System Sciences (HICSS'02)—vol. 3, 2002; 34 pp.

(Continued)

*Primary Examiner* — Miranda Le
(74) *Attorney, Agent, or Firm* — Fincham Downs, LLC; Magdalena M. Fincham, Esq.

(57) ABSTRACT

In accordance with some embodiments, processes and interfaces provide for enhancing search results of a group research project. For example, members of a group may be provided with information regarding other group member's search activities and/or be restricted from viewing certain search results (e.g., search results that are most popular with the public for a given search term, that are most popular with the group for the given search term or for the project, and/or search results that are restricted by a group manager).

19 Claims, 18 Drawing Sheets

(56) References Cited

U.S. PATENT DOCUMENTS

| | | | |
|---|---|---|---|
| 6,092,035 A | 7/2000 | Kurachi et al. | |
| 6,163,782 A | 12/2000 | Singhal | |
| 6,167,090 A | 12/2000 | Iizuka | |
| 6,229,840 B1 | 5/2001 | Ichihara | |
| 6,247,010 B1 | 6/2001 | Doi et al. | |
| 6,259,398 B1 | 7/2001 | Riley | |
| 6,321,228 B1* | 11/2001 | Crandall | G06F 17/30864 |
| 6,335,950 B1 | 1/2002 | Kohn | |
| 6,366,907 B1 | 4/2002 | Fanning et al. | |
| 6,415,281 B1 | 7/2002 | Anderson | |
| 6,442,540 B2 | 8/2002 | Sako et al. | |
| 6,449,256 B1 | 9/2002 | Varghese et al. | |
| 6,519,648 B1 | 2/2003 | Eyal | |
| 6,526,440 B1* | 2/2003 | Bharat | G06F 17/30864 |
| | | | 707/999.003 |
| 6,546,388 B1 | 4/2003 | Edlund et al. | |
| 6,601,061 B1* | 7/2003 | Holt | G06F 17/30864 |
| 6,643,641 B1 | 11/2003 | Snyder | |
| 6,947,924 B2 | 9/2005 | Bates et al. | |
| 7,031,961 B2* | 4/2006 | Pitkow | G06F 17/30884 |
| 7,072,888 B1 | 7/2006 | Perkins | |
| 7,120,615 B2 | 10/2006 | Sullivan et al. | |
| 7,190,121 B2 | 3/2007 | Rose et al. | |
| 7,200,226 B2 | 4/2007 | Bace | |
| 7,243,102 B1 | 7/2007 | Naam et al. | |
| 7,373,351 B2 | 5/2008 | Wu et al. | |
| 7,389,265 B2 | 6/2008 | Lawrence et al. | |
| 7,461,061 B2* | 12/2008 | Aravamudan | G06F 3/0481 |
| 7,502,783 B2 | 3/2009 | Palmon et al. | |
| 7,519,587 B2 | 4/2009 | Lawrence et al. | |
| 7,539,673 B2* | 5/2009 | Trowbridge | G06F 11/3438 |
| 7,565,630 B1 | 7/2009 | Kamvar et al. | |
| 7,574,426 B1* | 8/2009 | Ortega | G06F 17/30654 |
| 7,584,185 B2* | 9/2009 | Jatowt | G06F 17/30864 |
| 7,596,558 B2* | 9/2009 | Brewer | G06F 17/30864 |
| 7,599,918 B2* | 10/2009 | Shen | G06F 16/9535 |
| 7,617,193 B2 | 11/2009 | Bitan et al. | |
| 7,634,472 B2* | 12/2009 | Thrall | G06F 17/30867 |
| 7,669,179 B2 | 2/2010 | Gupta et al. | |
| 7,716,223 B2 | 5/2010 | Haveliwala et al. | |
| 7,739,274 B2 | 6/2010 | Curtis et al. | |
| 7,756,887 B1 | 7/2010 | Haveliwala | |
| 7,801,885 B1 | 9/2010 | Verma | |
| 7,818,315 B2* | 10/2010 | Cucerzan | G06F 17/30864 |
| | | | 707/723 |
| 7,819,898 B2 | 10/2010 | Stone et al. | |
| 7,827,125 B1 | 11/2010 | Rennison | |
| 7,831,609 B1* | 11/2010 | Alexander | G06F 16/9566 |
| | | | 707/765 |
| 7,856,434 B2 | 12/2010 | Guzman et al. | |
| 7,875,064 B2 | 1/2011 | Donnelly et al. | |
| 7,962,461 B2 | 6/2011 | Ruhl et al. | |
| 7,962,477 B2 | 6/2011 | Hu et al. | |
| 7,979,414 B2 | 7/2011 | George et al. | |
| 8,041,715 B2* | 10/2011 | Gnanamani | G06Q 30/02 |
| | | | 707/726 |
| 8,051,128 B2 | 11/2011 | Seshasai | |
| 8,095,582 B2* | 1/2012 | Cramer | G06Q 30/0244 |
| | | | 707/723 |
| 8,095,891 B2* | 1/2012 | Sugiyama | G06F 3/0482 |
| | | | 715/821 |
| 8,117,197 B1* | 2/2012 | Cramer | G06F 17/30702 |
| | | | 706/12 |
| 8,117,198 B2* | 2/2012 | Herlocker | G06F 17/30867 |
| | | | 707/707 |
| 8,150,843 B2* | 4/2012 | Chitiveli | G06F 17/30648 |
| | | | 707/705 |
| 8,326,829 B2 | 12/2012 | Gupta | |
| 8,332,430 B2 | 12/2012 | Koide et al. | |
| 8,341,146 B1 | 12/2012 | Bleckner et al. | |
| 8,620,915 B1* | 12/2013 | Brukman | G06F 17/30867 |
| | | | 707/733 |
| 8,661,029 B1* | 2/2014 | Kim | G06F 17/3053 |
| | | | 707/723 |
| 8,775,437 B2* | 7/2014 | Weitz | G06F 17/30864 |
| | | | 707/748 |
| 8,825,636 B2 | 9/2014 | Mach | |
| 8,886,637 B2* | 11/2014 | Bennett | G06F 17/30648 |
| | | | 707/723 |
| 8,954,420 B1* | 2/2015 | Khan | G06F 17/30867 |
| | | | 707/722 |
| 8,965,875 B1* | 2/2015 | Popovici | G06F 17/30864 |
| | | | 707/708 |
| 9,069,843 B2* | 6/2015 | Chitiveli | G06F 17/30648 |
| 9,223,868 B2* | 12/2015 | Battle | G06F 17/30864 |
| 2002/0069190 A1 | 6/2002 | Geiselhart | |
| 2002/0094083 A1 | 7/2002 | Bhattacharya et al. | |
| 2003/0009295 A1 | 1/2003 | Markowitz et al. | |
| 2004/0103122 A1 | 5/2004 | Irving et al. | |
| 2005/0125390 A1 | 6/2005 | Hurst-Hiller et al. | |
| 2005/0222989 A1 | 10/2005 | Haveliwawa et al. | |
| 2005/0240580 A1 | 10/2005 | Zamir et al. | |
| 2006/0020593 A1 | 1/2006 | Ramsaier et al. | |
| 2006/0047643 A1 | 3/2006 | Chaman | |
| 2006/0253428 A1 | 11/2006 | Katariya et al. | |
| 2007/0016583 A1 | 1/2007 | Lempel et al. | |
| 2007/0162547 A1* | 7/2007 | Ross | G06Q 10/10 |
| | | | 709/204 |
| 2007/0233671 A1 | 10/2007 | Oztekin et al. | |
| 2007/0260601 A1 | 11/2007 | Thompson et al. | |
| 2008/0005103 A1* | 1/2008 | Ratcliffe | G06Q 10/10 |
| 2008/0016053 A1 | 1/2008 | Frieden et al. | |
| 2008/0033915 A1 | 2/2008 | Chen et al. | |
| 2008/0040674 A1* | 2/2008 | Gupta | G06F 17/30884 |
| | | | 715/745 |
| 2008/0104045 A1 | 5/2008 | Cohen et al. | |
| 2008/0168037 A1 | 7/2008 | Kapadia et al. | |
| 2008/0215504 A1 | 9/2008 | Issen et al. | |
| 2008/0243779 A1* | 10/2008 | Behnen | G06F 16/2428 |
| 2009/0070128 A1* | 3/2009 | McCauley | G06F 21/604 |
| | | | 705/300 |
| 2009/0106221 A1* | 4/2009 | Meyerzon | G06F 17/30864 |
| 2009/0234834 A1 | 9/2009 | Cozzi | |
| 2009/0248656 A1* | 10/2009 | Blinnikka | G06F 17/30867 |
| 2009/0282021 A1 | 11/2009 | Bennett | |
| 2010/0131494 A1 | 5/2010 | Venolia | |
| 2010/0185611 A1 | 7/2010 | Liao et al. | |
| 2010/0191726 A1 | 7/2010 | Haveliwala | |
| 2010/0306224 A1 | 12/2010 | Ciemiewicz et al. | |
| 2010/0306249 A1 | 12/2010 | Hill et al. | |
| 2011/0004588 A1 | 1/2011 | Leitersdorf et al. | |
| 2011/0015996 A1 | 1/2011 | Kassoway et al. | |
| 2011/0029622 A1 | 2/2011 | Walker et al. | |
| 2011/0047136 A1* | 2/2011 | Dehn | G06F 17/30864 |
| | | | 707/706 |
| 2011/0103699 A1 | 5/2011 | Ke et al. | |
| 2011/0196875 A1 | 8/2011 | Vadlamani et al. | |
| 2011/0196896 A1 | 8/2011 | Smetters et al. | |
| 2011/0225139 A1 | 9/2011 | Wang et al. | |
| 2011/0264678 A1* | 10/2011 | Mital | G06F 17/30867 |
| | | | 707/759 |
| 2011/0264754 A1* | 10/2011 | Gidugu | G06F 8/36 |
| | | | 709/206 |
| 2011/0289076 A1 | 11/2011 | Boyle et al. | |
| 2012/0158685 A1* | 6/2012 | White | G06F 17/30867 |
| | | | 707/706 |
| 2012/0254076 A1 | 10/2012 | Yang et al. | |
| 2013/0132886 A1 | 5/2013 | Mangini et al. | |

OTHER PUBLICATIONS

Aditya Pal, and Jaya Kawale; "Leveraging Query Associations in Federated Search", Workshop on Aggregates Search, ACM (International Conference on Research and Development in Information Retrieval; (SIGIR), 2008; 9 pp.

Schenkel, Ralf and Theobald,Martin; "Structural Feedback for Keyword-Based XML Retrieval", Max-Planck-Institut fur Informatik, Saarbrucken, Germany; Lecture Notes in Computer Science, 2006, vol. 3936/2006; 326-337; 12 pp.

Banks, Sarah; "How the Internet Killed Creativity", The Weekly Pennsylvanian, Apr. 3, 2011; 1 pg.

(56) References Cited

OTHER PUBLICATIONS

Non-Final Office Action for U.S. Appl. No. 13/326,461 dated Feb. 27, 2012; 26 pps.
Notice of Allowance for U.S. Appl. No. 13/326,461 dated Aug. 15, 2012; 15 pps.
Non-Final Office Action for U.S. Appl. No. 13/326,593 dated Nov. 6, 2012; 16 pps.
Final Office Action for U.S. Appl. No. 13/326,593 dated May 17, 2013; 18 pps.
Non-Final Office Action for U.S. Appl. No. 13/326,593 dated Jul. 9, 2014; 24 pps.
Final Office Action for U.S. Appl. No. 13/326,593 dated Jan. 21, 2015; 26 pps.
S. Chung and D. McLeod, "Dynamic pattern matching: an incremental data clustering approach," Journal of Data Semantics, pp. 85-112, 2005.
S. Chung, J. Jun, D. McLeod, "A Web-Based Novel Term Similarity Famework for Ontology Learning," OTM 2006, pp. 1092-1109, Springer-Verlag.
Egele, Manuel, et al., "Removing web spam links from search engine results," Springer-Verlag, 2009, pp. 1-12.

\* cited by examiner

FIG. 3B

Browser window showing Yahoo search results for "181 e 85th st new york, ny":

- URL: https://www.yahoo.com/sd65#$^Sds
- Tab: 181 E 85th St New York, NY
- Navigation: Web Images Videos Shopping Apps Blogs More ▼
- Search box: 181 E 85th St New York, NY
- 577,000 results FILTER BY TIME
- Anytime
- Past day
- Past week
- Past month Map panel:
181 E 85th St
New York, NY 10028
maps.yahoo.com
Get directions...

Results:

1. Corcoran, 181 East 93rd Street, Upper East Side Real Estate ... 181 East 93rd Street, Upper East Side, Manhattan, Bess Freedman, Anisa Saroop, $729,000, Web ID 926755 www.corcoran.com/property/listing.aspx?Region=NYC&... - Cached 2. Corcoran, 181 East 65th Street, Upper East Side Real Estate ... 181 East 65th Street, Upper East Side, Manhattan, Loy Carlos, Carrie Chiang, $7,750,000 ... 151 East 85th Street - Apt: 14-15B: Upper East Side ... www.corcoran.com/property/listing.aspx?ListingID=1173513&... - Cached 3. Triple Mint Condos at 151 & 205 East 85th Street The Lucida - 151 East 85th Street The Brompton - 205 East 85th Street Two new condo ... what Stern has delivered at such crowd pleasers as The Chatham at 181 East 65th Street ...

4. 181st Street (Manhattan) - Wikipedia, the free encyclopedia West of Fort Washington Avenue, 181st Street is largely residential, bordering Hudson Heights and having a few shops to serve the local residents. East of Fort Washington Avenue, the street becomes increasingly commercial, becoming dominated... en.wikipedia.org/wiki/181st_Street_(Manhattan) - Cached 5. StreetEasy Condos for Sale in NYC zoned for PS 290 Manhattan ... 151 East 85th Street #12A Condo, Upper East Side Listed by Gumley Haft Kleier ... 181 East 65th Street #18A Condo, Lenox Hill Listed by Caroll Group streeteasy.com/nyc/sales/nyc/type:D|school:ps290-manhattan - Cached President Clinton first year in white house -- Google Search -- Windows Internet Explorer https://www.google.com/sd6 5#$^Sds ⭐ Favorites president clinton first year in white...

Web  Images  Videos  Maps  News  Shopping  More ▼

Google

| Search | President Clinton first year in the white house with some subtraction |

About 2,270,000 results (0.21 seconds)

Everything
Images
Videos
Maps
News
Shopping
More...

Hartford, CT
Change Location

Show Search Tools

1. <u>President Clinton</u>
   Later that same year, she married an automobile salesman named Roger *Clinton*. ... Girls Nation were invited to the *White House* to meet *President* Kennedy. Bill *Clinton* was one of the *first* in line to shake *President* Kennedy's hand in the ... Governor *Clinton* lost the race for a second term to Republican Frank White. ...
   clinton4.nara.gov/WH/EOP/OP/html/Hope.html - <u>Cached</u> - <u>Similar</u>

2. <u>Bill Clinton News - The New York Times</u>
   There he shook hands with *President* John F. Kennedy in the *White House* Rose Garden ... In foreign policy, Mr. *Clinton's first year* was symbolized by searing ...
   topics.nytimes.com › <u>Times Topics</u> › <u>People</u> › C - <u>Cached</u> - <u>Similar</u>

3. <u>The Book - White House Doctor</u>
   Mariano served nine years as *White House* doctor, *first* for the final *year* of ... She talks about the time she raced to get *President Clinton* and his family ...
   www.whitehousedoctor.com/the-book.html - <u>Cached</u> - <u>Similar</u>

4. <u>Clinton - Reagan, Bush, Clinton, Kennedy & Other Presidential ...</u>
   Oct 3, 2010 ... This was the pen that *President Clinton* used during his *first year* in The *White House*. It is an Alexander pen with a black barrel and a gold ...
   halftothechiefs.com/itemsBC.htm - <u>Cached</u>

5. <u>Bill Clinton Biography - Forty-second *President* of the United States</u>
   Bill *Clinton's* Career Before the *Presidency*. In 1974, *Clinton* was a *first year* law professor and ran for the *House of Representatives*.
   americanhistory.about.com › ... › <u>William J Clinton</u> - <u>Cached</u> - <u>Similar</u>

SYSTEMS AND METHODS FOR FACILITATING ENHANCEMENTS TO SEARCH RESULTS BY REMOVING UNWANTED SEARCH RESULTS

The present Application is a Continuation application of U.S. application Ser. No. 13/326,593, filed on Dec. 15, 2011 in the name of Alan Reznik and entitled SYSTEMS AND METHODS FOR FACILITATING ENHANCEMENTS TO ELECTRONIC GROUP SEARCHES, which application claims the benefit of U.S. Provisional Application Ser. No. 61/481,236, filed on May 1, 2011 in the name of Alan Reznik and entitled Methods and Systems for Search Engine Enhancements. The entirety of each of these Applications is incorporated by reference herein for all purposes.

The present Application is related to U.S. Non-Provisional application Ser. No. 13/326,461, filed on Dec. 15, 2011 in the name of Alan M. Reznik and entitled SYSTEMS AND METHODS FOR FACILITATING ENHANCEMENTS TO SEARCH ENGINE RESULTS. The entirety of this application is incorporated by reference herein for all purposes.

BRIEF DESCRIPTION OF THE FIGURES

FIG. 3B is a diagram of one interface via which a user may be provided with search results utilizing a second search engine after inputting the same search term utilized in FIG. 3A, in accordance with the prior art.

FIG. 3E is a diagram of one interface via which a user may be provided with search results utilizing the search engine of FIGS. 3A and 3D, the search utilizing a method available in the prior art to refine the search for the term utilized in FIG. 3D.

FIG. 7 is a diagram of one example interface, consistent with some embodiments described herein, via which a user to whom a set of search results is output may indicate undesirable search results to be removed from the set of search results.

FIG. 11 is a diagram of yet another example interface, consistent with some embodiments described herein, via which a user to whom a set of search results is output may indicate undesirable search results to be removed from the set of search results.

DETAILED DESCRIPTION OF THE EMBODIMENTS

Figure 1:
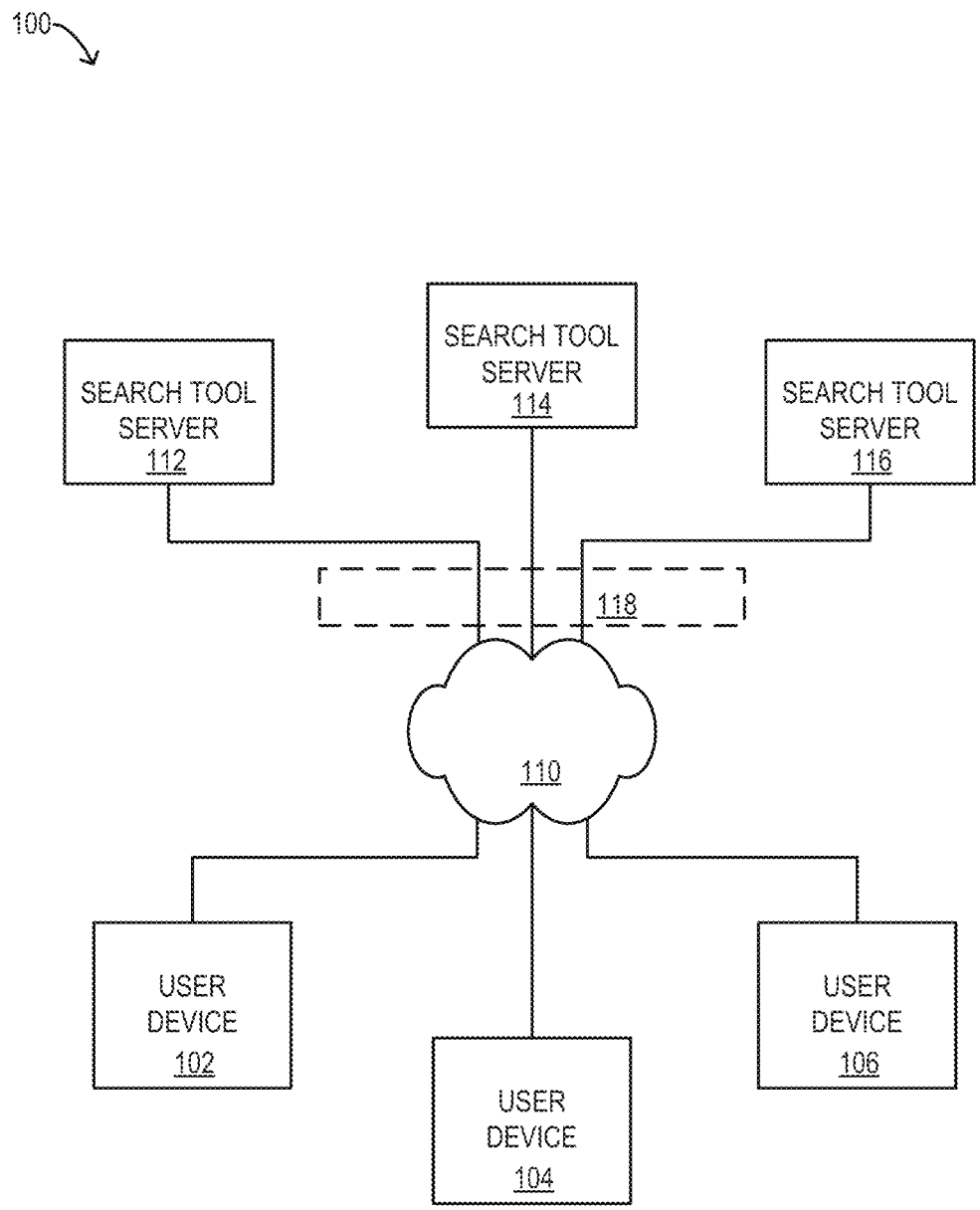
FIG. 1 is a schematic diagram of one embodiment of a system operable to facilitate some methods described herein.

Certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and it is possible that no single feature is solely responsible for its desirable attributes or is essential to practicing the inventions herein described.

Embodiments described herein are directed to methods, systems and interfaces for providing one or more enhancements to a search engine, search algorithm or other search tool, such that results output by the search tool may be modified, refined and/or filtered based on an input from a user, such as an input indicating which of the results are unwanted or undesired by the user. Such methods, systems and interfaces further provide for, in accordance with at least one embodiment, allowing a user to more efficiently identify wanted but unknown information which may be buried in a deluge of search results. For example, a search engine may perform a search of available information based on one or more search terms input by a user and present an initial list of search results to a user via an interface. This interface may allow the user to "check off" or otherwise indicate which one or more of the results which have insufficient current value to the user. The search engine may then (i) rerun the search based on that "negative feedback" to identify a modified list of results, which presumable will not include the one or more results indicated by the user as unwanted or undesired (and/or other similar results); and/or (ii) modify the initial list of search results by removing not only the result(s) indicated by the user as unwanted or undesired but also other similar results. In either case, the goal is to shorten the list of results the user needs to consider or review. In scenario (ii), the other similar results may be identified based on a characteristic they share with the particular result the identified by the user as being unwanted or undesirable.

In another example, a user requesting a search (e.g., by inputting one or more search terms) may further indicate (e.g., prior to launching or initiating the search) one or more rules or criteria defining unwanted or undesired search results. For example, the user may indicate that he/she considers the top 5 most popular results to be undesirable. Such an indication of one or more rules or criteria may be utilized by a search tool, in one embodiment, as a filter for any search results found based on one or more search terms input by the user, the filter for filtering out which search results are not to be output to the user. For example, in one such an embodiment, a search engine (or another device operable to perform some of the methods described herein) may remove any search results that satisfy the rule or criteria identified by the user. In some embodiments, the removal may be done prior to outputting to the user the search results, such that the user is not shown the removed search results as part of listing of search results (e.g., unless the user selects an option to see such removed search results, as may be available in some embodiments).

It should be noted that an unwanted or undesired search result need not be a result that is not relevant or appropriate based on the search term(s) provided by the user for the initial search. In fact, it may be that a result that the user indicates as undesirable or unwanted may be a result ranked as highly relevant and/or popular by the search engine being used for the search. An unwanted or undesired search result is simply a result that the user prefers not to have included in the list of search results for a particular search, for any reason. Applicant has recognized that the results of searches carried out by use of search engines, tools and algorithms available today comprise such a large set of results that in many circumstances it is unlikely that a user who requested the search will have the time, desire or ability to view each of the results in the set. Applicant has further recognized that this inability or unwillingness to view all of the search results may result in the user missing out on learning some important information that may be "buried" in the large amount of search results. Embodiments described herein provide for a strategy and interface to allow a user of a search tool or resource (e.g., the common search engine user) better access and control over search queries and the results. Applicant has recognized that most users have an intuitive ability to better discern what is not wanted more quickly and decisively than what is wanted. In recognition of this human ability, at least some embodiments described herein comprise a process which provides one or more mechanisms for removing unwanted results efficiently as a method of obtaining a better result. Further, in at least some embodiments described herein a modified set of search results is obtained for a user who indicates which results of an initial set of search results are unwanted by not only removing the specifically selected results but further modifying the search to remove other similar results that are determined by the system to also be unwanted or likely to be unwanted based on the user input. Such embodiments may be contrasted with prior art search methodologies which rely on positive feedback ("more like this") from a user or which only allow a user to modify a search by removing a single search result at a time or by manually modifying the specific search terms used and rerunning the search. This is further contrasted from prior art that uses the aggregate of what other users found desirable when they have searched for a similar term or query to determine the information the current user values. This ubiquitous process further limits a given user from finding new or novel information in a given search when new and novel information or associations are desired by the user.

It should be noted that in some embodiments an identification of a particular search result may be received from a user to whom an initial list of search results is output in response to search terms provided, and a determination may be made by a processor (e.g., a processor running a search algorithm or search engine or a processor of another device that is operable to communicate with a search engine) of additional search results to be removed based on an identification of the particular search result. Such a determination of additional search results to be removed may be made, in accordance with some embodiments, based on a characteristic of the particular search result identified by the user. The characteristic may be derived or identified by the processor without input from the user as to the characteristic or, alternatively, the characteristic may be identified (e.g., selected from a menu of possible characteristics, typed in or otherwise specified) by the user.

In accordance with one embodiment, a method provides for (i) determining a first plurality of search results of a search performed by a search tool; (ii) receiving an input of a user associated with the first plurality of search results, the input indicating at least one result of the first plurality of search results to be removed from the first plurality of search results, thereby receiving an indication of at least one first undesired search result of the first plurality of search results; (iii) determining a remainder of the first plurality of search results to be the first plurality of search results less the first undesired search result; (iv) identifying a characteristic of the at least one first undesired search result; (v) analyzing the remainder of the first plurality of search results to determine whether any search results of the first plurality of search results correspond to the characteristic; (vi) determining at least one search result of the remainder of the first plurality of search results that corresponds to the characteristic to be a second undesired search result; (vii) removing the first undesired search result and the second undesired search result from the first plurality of search results, thereby determining a second plurality of search results; and (viii) causing the second plurality of search results to be output.

In accordance with another embodiment, a method provides for (i) determining a first plurality of search results of a search performed by a search tool; (ii) receiving an input of a user associated with the first plurality of search results, the input indicating a preference for a maximum popularity ranking of a search result, in accordance with a ranking scheme in which a higher popularity ranking indicates a more popular search result than does a lower popularity ranking; (iii) analyzing the first plurality of search results to identify any search results corresponding to a popularity ranking higher than the maximum popularity ranking; (iv) removing from the first plurality of search results, any search results that correspond to a popularity ranking higher than the maximum popularity ranking, thereby determining a second plurality of search results; and (v) causing the second plurality of search results to be output.

In accordance with another embodiment, a method for facilitating a group research project to be managed in a manner that encourages more diverse search results than may otherwise be obtained using conventional search methods which allow all members of the group to simply search the Internet or another data source without restriction (as is explained in more detail below). Such a method provides for (i) registering a plurality of users as a search group for a search project; (ii) designating one user of the plurality of users as a manager for the search project, wherein the manager for the search project is authorized to set search rules for the search project which govern an output of search results to the remainder of users of the search group; (iii) receiving, by a processor of a computing device operable to modify a set of search results and from one of the plurality of users, an indication of at least one search result to be removed from a set of search results output to another user of the search group, thereby receiving an indication of at least one disallowed search result; (iv) determining, by the processor, a preliminary set of search results based on the search term, the preliminary set of search results comprises results of a search of information available on the internet; (v) determining, by the processor, whether the disallowed search result is included in the preliminary search results; (vi) if the disallowed search result is included in the preliminary search results, removing, by the processor, the disallowed search result from the preliminary search results, thereby determining a modified set of search results; and (vii) causing the modified set of search results to be output to at least the user from whom the search term was received.

In accordance with one embodiment for facilitating a group research project, a method provides for (i) registering a plurality of users as a search group for a search project; (ii) tracking sets of search results output to users of the search group for the search project; and (iii) outputting, to a user of the search group an indication of a plurality of search results included in any of the set of search results along with, for each such search result, at least one of (i) a number of times the search result has been included in a set of search results output to the users of the search group; (ii) a duration of time a single user of the search group has spent reviewing a content of the search result; (iii) a total duration of time all users of the search group who had the search result output to them in a set of search results reviewing the content of the search result; (iv) a number of time the search results has been selected by a user of the search group; and (v) present a mathematical assessment of the search result output or page use (e.g., an average or median time spent by one or more users on a given search result, a a number of repeat views of a given search result by one or more users or an average user).

It should be noted that any of the methods and processes described herein may be performed, in some embodiments, by one or more processors of one or more a computing devices operable to modify search results. For example, in some embodiments, one or more servers of a search engine provider may perform one or more processes described herein. In another embodiment, a server of an intermediary service which serves to facilitate searches requested by a user and performed by a search engine provider may perform one or more of the processes described herein. In yet another embodiment, a software application may be downloaded to a user's computing device (e.g., a mobile device) may be operable to perform one or more processes described herein. For example, a user may download an "app" for allowing the user to filter out or remove search results in accordance with one or more of the embodiments described herein.

Example Systems and Apparatus

Referring now to FIG. 1, illustrated therein is schematic diagram of an example system 100 which may be utilized to provide some of the processes described herein. The system 100 comprises a plurality of user devices 102, 104 and 106 and a plurality of search tool servers 112, 114 and 116. In accordance with some embodiments, system 100 further includes a third party server 118, which may comprise a server which facilitates search requests from and/or output of search result to any or all of the user devices 102, 104 and 106. Any of the devices 102, 104, 106, 112, 114, 116 and 118 may in accordance with some embodiments be operable to communicate with at least one other device of system 100 via a network 110. The network 110 may comprise, for example, the Internet, a wide area network, another network or a combination of such networks. It should be understood that although not shown in FIG. 1, other networks and devices may be in communication with any of the devices of system 100. For example, a user device 102 may comprise a mobile device which may be in communication with a search tool server 112 via a mobile network (not shown) such as a pager or cellular telephone network that accommodates wireless communication with mobile devices as is generally known to those skilled in the art.

A search tool, as the term is used herein, may comprise a mechanism comprising software, hardware and/or firmware operable to electronically search through a large quantity of available data (whether private or publicly available data) to identify or determine subset(s) of the data that may be relevant to one or more search terms or criteria provided by a user of the search tool. One type of search tool contemplated herein is a search engine, which may comprise an algorithm designed to search through information available on the Internet and/or a private network. Many search engines are designed to index a large number of web pages or other formats of information and provide an interface via which a user may search the indexed information by, for example, inputting one or more terms and/or rules defining a particular search. A search engine may, for example, be operable to utilize a "crawler" mechanism which "crawls" the Internet to locate documents or other formats of information and store data about such documents or other information such that these may be located and/or searched at a later time (e.g., the search engine may store the URL, associated hyperlinks, meta-data, etc.). Many search engines utilize extraction and/or indexing mechanisms for extracting and/or indexing information about the documents, web pages or other formats of information accessible to them. Such indexing may be based on the contents of the documents, web pages or other information and the indexed form of the information may be stored in a database of the search engine. The search engine may comprise a search tool component which allows a user of the search engine to search through the indexed contents of the database. A search engine may also be operable to output the results of any search of the database (the search having been conducted in accordance with the search terms and/or rules provided by the user), may times in accordance with a particular ranking scheme programmed into the search engine. For example, many search engines rank the most popular search results associated with a particular search term higher than less popular search results.

As described above, in some embodiments a search tool or search engine may be operable to search a database of available information. The database may, in some embodiments, be proprietary to the search tool. In other embodiments, the database may be a shared database. In either scenario, the database may be stored by one or more search tool servers 112, 114 and 116 and/or a third party server 118 (e.g., in a memory of the appropriate server), on the Web or in Cloud Storage (e.g., in a memory of a server distinct from the search tool server accessing the database) or in some alternate data storage location. Further, while in some embodiments such a database of information may have been generated by the search tool or third party server accessing the database, in other embodiments the database may have been created by another entity or server. Finally, although reference has been made to a search tool or search engine searching a database in order to determine search results, it should be understood that such a data storage scheme is not necessary to carry out the embodiments described herein and other data storage schemes may be desirable or appropriate. For example, in some embodiments a search tool or search engine may be operable to search through data or information stored in spreadsheet, a particular file or document and/or a hierarchical or other file storage scheme.

Any and all of the search tool servers 112, 114 and 116 (as well as third party server 118) may comprise one or more computing devices, working in parallel or series if more than one, operable to facilitate the enhanced search result modification functions described herein. Any and all of the user devices 102, 104 and 106 may comprise, for example, a computing device operable to receive input from a user regarding a search to be conducted (e.g., one or more search terms to be used in conducting the search and/or one or more characteristics, rules or criteria to be used in modifying the results of the search as they are to be output to the user).

In some embodiments, a user device such as a user device 102, 104 or 106 may comprise a portable computing device such as a smartphone (e.g., the IPHONE or IPAD manufactured by APPLE, the BLACKBERRY manufactured by RESEARCH IN MOTION, the PRE manufactured by PALM or the DROID manufactured by MOTOROLA), a Personal Digital Assistant (PDA), cellular telephone, laptop or other portable computing device. In other embodiments, a user device may comprise a desktop, kiosk, ATM or other non-portable computing devices. In some embodiments, a user device may be a dedicated device dedicated to outputting search results and receiving user feedback regarding such search results. In some embodiments, a user device may comprise a simplified computing device with limited processing power, such as a digital picture frame or a CHUMBY device. In some embodiments, a user device may be integrated into another system, packaging, structure or device, such as a vehicle, wearable apparel, entertainment system and/or be operable to dock or connect with a wireless enabling accessory system (e.g., a Wi-Fi docking system). In some embodiments, a user device may be operable to synchronize with a local or remote computing system to receive, download or upload content, download software applications and to receive and/or transmit other data.

It should be understood that any or all of the devices of system may in some embodiments comprise one or more of (i) an input device; (ii) an output device; (iii) an input/output device; or (iv) a combination thereof.

An input device, as the term is used herein, may be any device, element or component (or combination thereof) that is capable of receiving an input (e.g., from a user or another device). An input device may communicate with or be part of another device. Some examples of input devices include: a bar-code scanner, a magnetic stripe reader, a computer keyboard or keypad, a button (e.g., mechanical, electromechanical or "soft", as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port, and a weight scale.

An output device may comprise any device, component or element (or a combination thereof) operable to output information from any of the devices described herein. Examples of an output device include, but are not limited to, a display (e.g., in the form of a touch screen), an audio speaker, an infra-red transmitter, a radio transmitter, an electric motor, a dispenser, an infra-red port, a Braille computer monitor, and a coin or bill dispenser.

An input/output device may comprise components capable of facilitating both input and output functions. In one example, a touch-sensitive display screen comprises an input/output device (e.g., the device outputs graphics and receives selections from an authorized person).

It should be understood that each of the devices of system 100 may communicate with one another directly or indirectly, via a wired or wireless medium such as the Internet, LAN, WAN or Ethernet, Token Ring, or via any appropriate communications means or combination of communications means. For example, in one embodiment communication among any and all of the devices of system 100 may occur over the Internet through a Web site maintained by computer on a remote server or over an on-line data network including commercial on-line service providers, bulletin board systems and the like. In yet other embodiments, communication among any of the devices of system 100 may occur over RF, cable TV, satellite links and the like.

The system 100 may be operable to facilitate communication among the devices comprising the system using known communication protocols. Possible communication protocols that may be part of the system 100 include, but are not limited to: Ethernet (or IEEE 802.3), ATP, BLUETOOTH, HTTP, HTTPS and Transmission Control Protocol/Internet Protocol (TCP/IP). Communication may be encrypted to ensure privacy and prevent fraud in any of a variety of ways well known in the art, some of which are described herein.

It should be understood that although only three user devices 102, 104 and 106 and three search tool servers 112, 114 and 116 are illustrated, any number of such devices may be used and, in many embodiments, a large or smaller number of each such device would be part of system 100. It should further be understood that although a system 100 comprising multiple devices is illustrated, such a system is not necessarily (and probably is not) operated or maintained by a single entity. For example, each of the search tool servers 112, 114 and 116 may be operated by a distinct entity (e.g., search tool server 112 may be operated by GOOGLE, search tool server 114 may be operated by BING and search tool server 116 may be operated by YAHOO!) and each of the user devices 102, 104 and 016 may be operated by a different user. In some embodiments, the search result modification functions described herein may be made available only from a particular search tool provider (e.g., GOOGLE). In such an embodiment, only one search tool server may be appropriate or each of the search tool servers 112, 114 and 116 may be operated by or on behalf of the same entity.

Described herein are various processes, features, interfaces and mechanisms for allowing a user to refine or modify a set of search results by providing feedback such as indication(s) that one or more particular search result(s) are considered undesirable and removing from a listing of search results the indicated search result(s) along with additional search result(s) that are determined to be associated with, corresponding to, relevant or likely to be undesirable for the same reason(s) as the indicated search result(s). In some embodiments, a search tool server such as a search tool server 112, 114 and/or 116 may be programmed and modified to facilitate such processes, features, interfaces and mechanisms directly (e.g., the processes described herein may be integrated into a search engine). For example, a web browser interface of a search tool as it is output to a user may be modified to allow the user to provide indications of which search results are undesirable (and/or to "undo" such indications) and the associated search tool server may be operable to not only perform a search requested by the user but also refine or modify the listing of search results based on the user's feedback or instructions. In other embodiments, however, such processes, features, interfaces and mechanisms may be embodied in a software application that resides on a third party server 118 which serves as an intermediary service which facilitate the output (and modification) of search results determined by a search tool to a user. In yet other embodiments, such processes, features, interfaces and mechanisms may be embodiment as a software application that resides in a memory of a user device (e.g., a user may download or install the software application onto his device), which software application may be programmed to either automatically launch upon detecting certain triggering events (e.g., when a user opens a web browser, when a user navigates the browser to a search tool URL, etc.) or when it is affirmatively launched or opened by the user. For example, in some embodiments the features described herein may be embodied as an "app" that is downloadable onto a user device such as an ANDROID, IPHONE or IPAD. In the group research embodiments described herein, such an app may allow a user to link his search results to those of a group (e.g., a classroom, library, business or other setting). In some embodiments a search tool server, third party server or user device may store in its memory a program for facilitating at least some of the processes and embodiments described herein.

Description of Context for Some Embodiments

Figure 2:
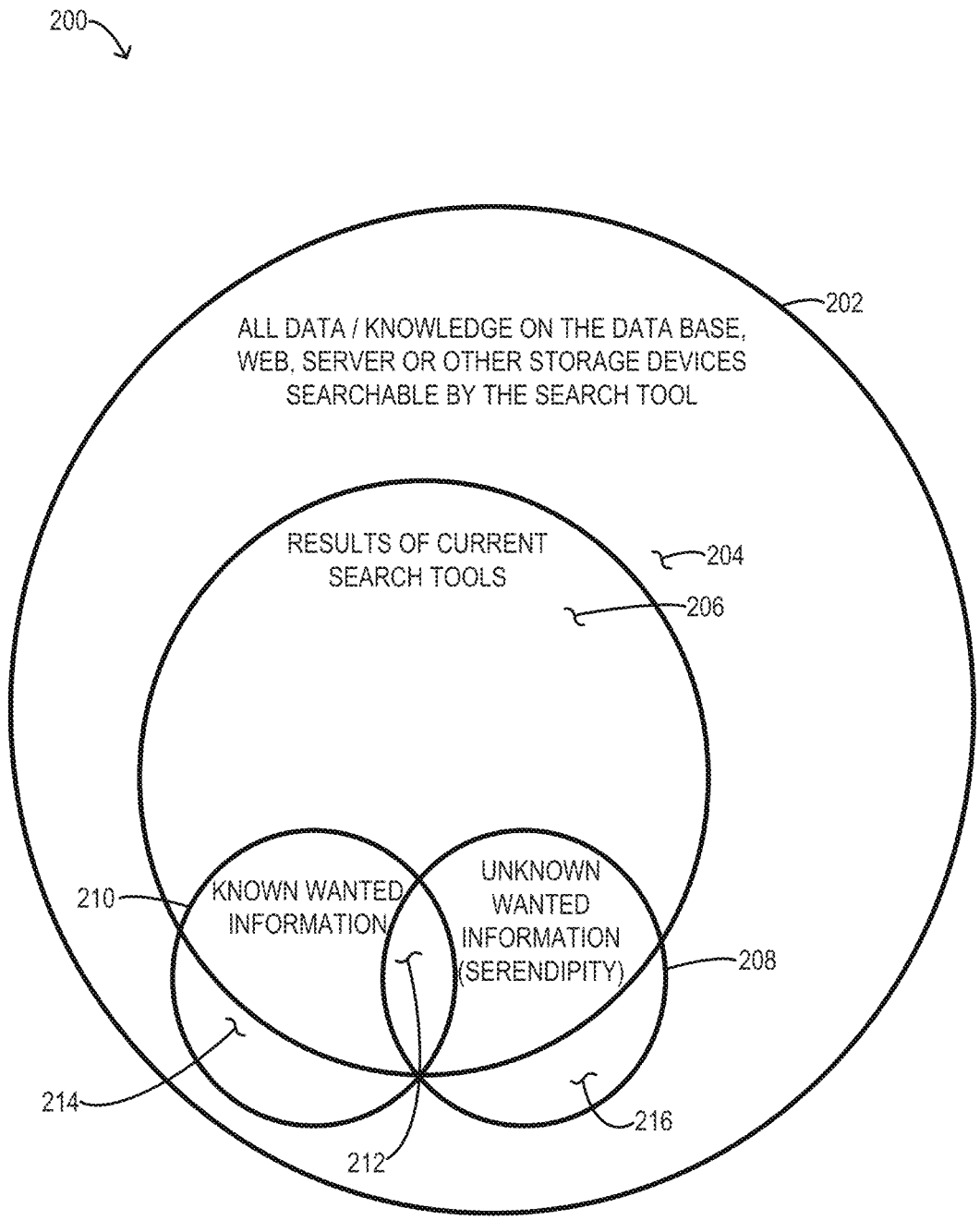
FIG. 2 is Venn diagram illustrative of some advantages which may be realized via some methods described herein.

Referring now to FIG. 2, illustrated therein is a Venn diagram illustrating some advantages or benefits that may be realized in utilizing the search result modification functions described herein. Applicant has recognized that the hallmark of the best search engines is the ability to narrow the massive amount of information remotely related to the target query into a tractable list. The list needs to be both an accurate representation of the search request and short enough to be evaluated by the user who requested the search within a practical time frame. Therefore, speed and accuracy are two of the many attributes expected from current search technology. Speed, in particular, is judged as quick enough to be timely for the user of the search engine. Timely, in turn, is measured in less than a few seconds. Accuracy is measured by the closeness of the result to the wanted information. Still, speed and accuracy are not enough. Inclusivity is also important. To be inclusive means the search results contain all information the user may already know about as well as other information that may be of value to the user that the user is yet to discover. The discovery of information that is of value and not known to exist prior to the search could be termed "serendipity." It could be argued that the web and other data bases have created the most value by giving the general user access to both the information that is known to be available and that information that was not known to be available. In other words, there is real value in serendipity.

Search speed, accuracy, inclusiveness and serendipity are of importance to most users and this, for the most part, is the ultimate goal of search services such as GOOGLE, BING, YAHOO! and BADU. These and many other search engines for internet acquirable information, internet data bases and non-internet database searches are after the same goal, namely all the factors mentioned and hence a satisfying user experience. Furthermore, one could argue that without all of these factors speed, accuracy, inclusiveness and serendipity the enormous success of the current engines would not have occurred. Moreover, the astronomical wealth of information on the web would not be accessible to the average user without these search engines. Still, the wealth of information on the web is ever expanding and the actions associated with inclusiveness and serendipity can often be in direct conflict with speed and accuracy. As a direct result, to be truly inclusive and allow for serendipity many search engines report back tens or hundreds of thousands (sometimes even millions) of results. The end result is an intractable list and a net loss of the available serendipity because few users can wander past the first ten to twenty results.

The value of serendipity cannot be truly estimated. Knowing how closely serendipity and discovery are linked, it is hard to quantify what is new information that was actively searched for and what is new information that was unexpected. It is equally difficult to imagine a world without some level of serendipity. Still, in an effort to improve searches accuracy is increased and serendipity is often sacrificed. In the most sophisticated searches accuracy is judged by laser sharpness leaving little room for serendipity. Many other engines are judged by supplying the most popular results again reducing serendipity.

In order to better understand the relationships, illustrated in FIG. 2 is a Venn diagram 200 showing the sets of information that represent a generic version of all data available and the common subsets of possible search results. The figure shows the relationship between the pool of all information available/searchable via a particular search tool (202), the set of search results for a particular search request (204) as well as a representation of the subset of search results which comprise wanted results (210) as circles in the diagram 200. The diagram 200 also includes a subset of unwanted information 206 contained within the search results 204 and the smaller sets of known wanted information (210) and unknown wanted information or serendipity (208). In this way we can see the union of the sets of wanted known information (206) and serendipity (208) contains the search results most likely to be desirable to many users. The intersection of the two sets (212) is the overlap of wanted known information (210) and wanted yet unknown information (208) is of special interest in expanding one's knowledge. Also illustrated via the diagram 200 is how the prior art search tools leave some of the wanted information out. These are shown in the areas inside the sets of wanted information (210) and serendipity (208) that lie outside the set of search results (204) and are indicated as areas (214) and (216) respectively. From these sets in the diagram 200 one can see that there is a need for a search result modification mechanism (such as ones described herein) which can effectively remove (or allow a user associated with the search results to remove) the unwanted subset of the search results (206) that is not in the set of known wanted search results (210) and the set of serendipity (unknown yet wanted results) (208). There is further a need for a search result modification mechanism (such as ones described herein) which allows a user to efficiently identify the data in each of the sets (208) and (210) that is not in the original search result (204), the information which would be includes in the areas (214) and (216).

To solve the conflict between providing all accessible information to be inclusive and still be accurate many search engines today are programmed to rank the most popular results higher than the most novel results in a given list of search results out put to a user (i.e., the most popular search results appear first in the list of search results). This causes a further loss of serendipity and some loss of accuracy as defined by an individual user's search requirements. This, in turn, yields an unsatisfying experience for the user in their search of new information. This frustration is an experience we can all relate to, thousands of results but nothing of true interest. The user is then forced to wander around in the set of unwanted search results (the results represented by area 206 of diagram 200). This leads many users conducting a search to think hard about what search result they are looking for and another attempt at getting it "right." Many users continue on frustrated and less and less willing to look further down a list of search results as the time required to find what they want increases and the value of the search activity decreases. Lost in the large set of unwanted results, any chance at a great answer to the user's question diminishes along with any real opportunity for a serendipitous finding of value.

As current engines look for a solution for this issue, the many thousands of results are ranked in several ways. Most commonly by what other searchers may think combined with algorithm ranking, objects that are highly linked and even your own prior searches or search behaviors in prior searches. This practical application of technology has created a bias to what others are looking for and this, as we all know, is self-reinforcing since few searchers move past the first ten (10) results when presented with literally thousands to review. So, the problem remains. How does one get a search engine to deliver the information that is most useful?

Applicants has recognized, however, that the human mind can more quickly reject a poor search result than a good one. In other words, the user who has input search terms for a search and been provided with search results has a natural ability for a sharper distinction about what they do not want than what they do want. Applicant has further recognized that it is the elements of what is not wanted in a search that often keeps the search from being a successful search. Seeing the volume of unwanted information in the search results is an unsatisfying experience. Applicant has thus recognized that if a user were given proper tools or a set of tools for easily removing the noise or unwanted information, finding the information the user wants would be simplified and more satisfying.

Figure 3A:
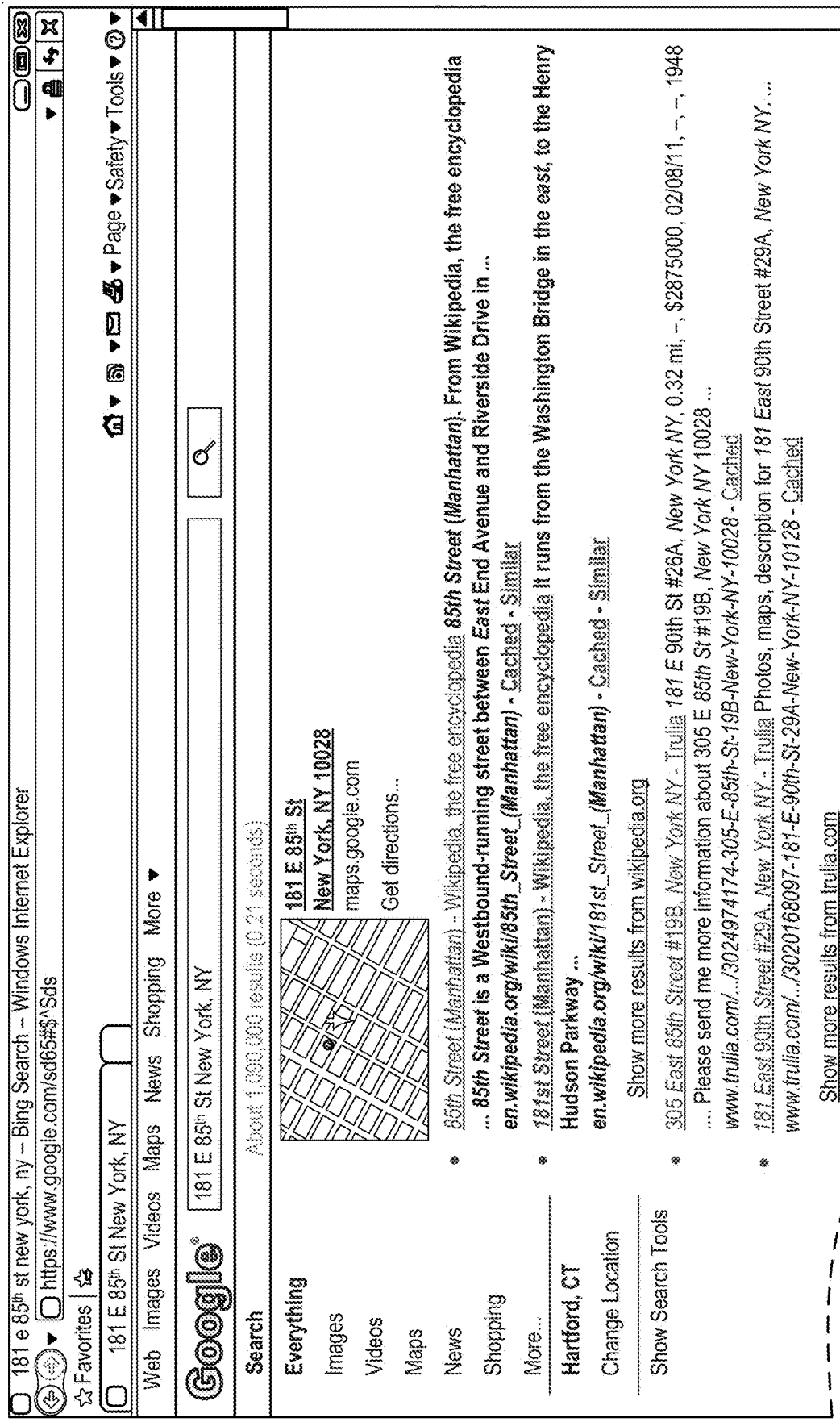
FIG. 3A is a diagram of one interface via which a user may be provided with search results utilizing a first search engine after inputting a particular search term, in accordance with the prior art.
Figure 3C:
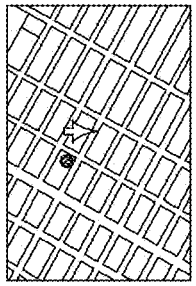
FIG. 3C is a diagram of one interface via which a user may be provided with search results utilizing a third search engine after inputting the same search term utilized in FIG. 3A and FIG. 3B, in accordance with the prior art.

Turning now to FIGS. 3A through 3C, illustrated therein are respective example user interfaces illustrating prior art search results for the indicated search term "181 E 85th St New York, N.Y. 10028". FIG. 3A comprises a user interface depicting search results output to a user using the GOOGLE search engine after the user input the search term "181 E 85th St New York, N.Y. 10028." As indicated on FIG. 3A, over one (1) million results were returned to the user. FIG. 3B comprises a user interface depicting search results output to a user using the YAHOO! search engine after the user inputs the same search term "181 E 85th St New York, N.Y. 10028." As indicated on FIG. 3B, about 527,000 results were returned to the user. FIG. 3C comprises a user interface depicting search results output to a user using the BING search engine after the user inputs the same search term "181 E 85th St New York, N.Y. 10028." As indicated on FIG. 3C, about 474,000 results were returned to the user. It should be noted that, due to page space constraints, only the first few results output to the user on the first web page of search results are shown in each of the figures. It should further be noted that the search results illustrated in each of the figures are based on an actual search using the search term "181 E 85th St New York, N.Y. 10028" conducted on each respective search engine in the year 2011.

Figure 3D:
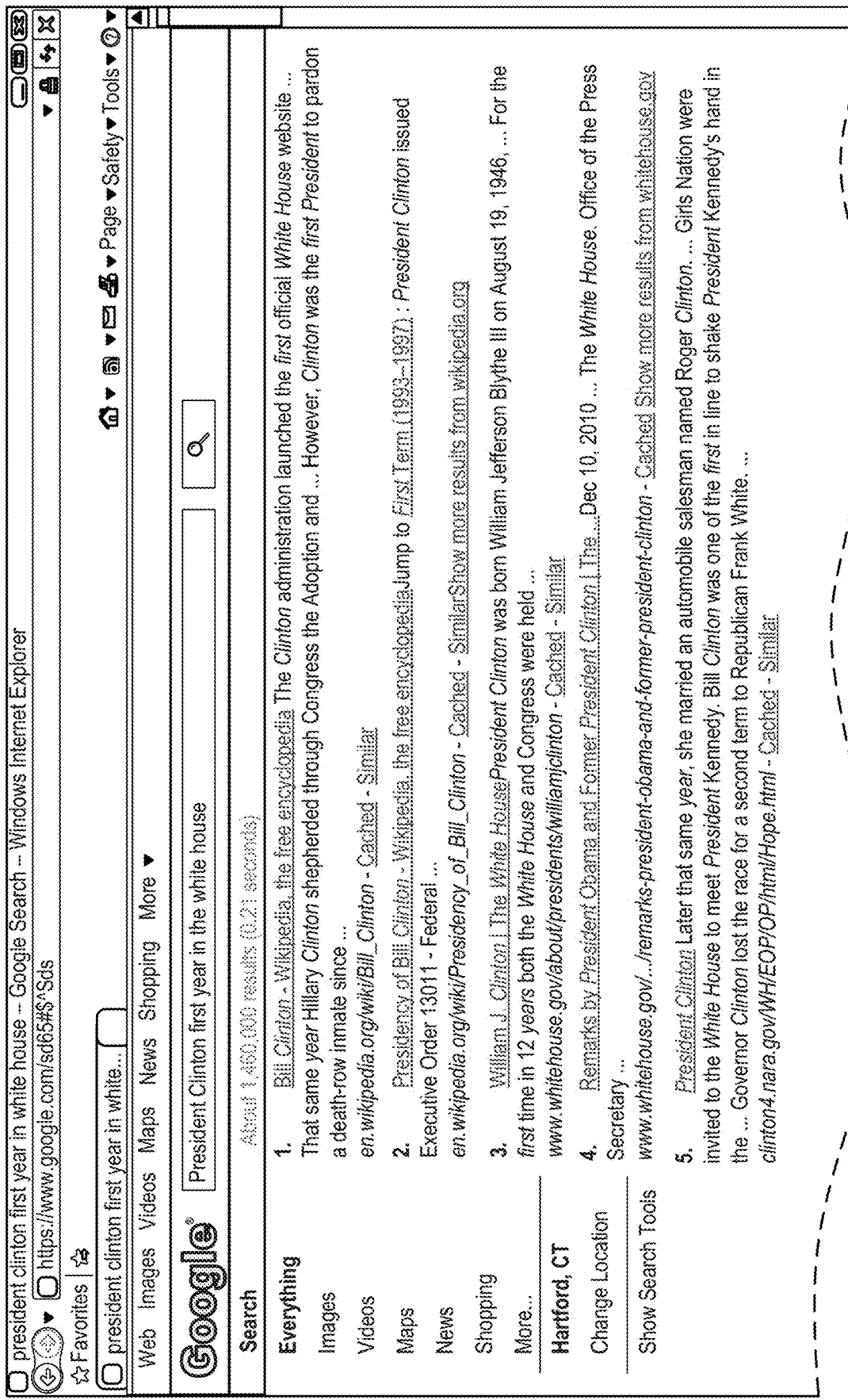
FIG. 3D is a diagram of one interface via which a user may be provided search results utilizing the first search engine of FIG. 3A but after inputting a different search term, in accordance with the prior art.

FIG. 3D comprises a user interface depicting search results output to a user using the GOOGLE search engine after the user inputs the search term "President Clinton first year in the white house." As indicated on FIG. 3D, over 1.4 million search results were returned to the user. FIG. 3E comprises a user interface depicting search results output to a user using the GOOGLE search engine after the user utilized GOOGLE's advanced operators to try to remove known unwanted information after viewing the first search results output after an initial search based on the search term "President Clinton first year in the white house." In considering the massive quantity of results returned by each of the search engines for a fairly specific search term, as illustrated in FIGS. 3A through 3D, one can appreciate that unwanted information can easily overwhelm the results and create significantly distracting "noise" that may keep a user from efficiently finding the wanted results. One can also appreciate that most users, in viewing the results on a particular page would likely be able to easily determine which results are not wanted or undesired.

FIG. 3E illustrates the result of attempting to remove unwanted information returned in an initial search using an available search engine mechanism. As shown in FIG. 3E, rather than decreasing the number of search results such that the set of search results is more manageable for the user, the refined search yielded many more search results (over two (2) million this time). Thus, using the advanced search feature on a search engine such as GOOGLE by taking advantage of its algorithm or method to fine tune the search returns somewhat paradoxically almost twice as many search results. This is of interest since the effort to reduce or focus results using the current state of the art actually yields more results not less results. This is the opposite of what one would expect. This paradoxical result of more results even when trying to remove the unwanted results further demonstrates the need in the state of the art for an alternative strategy. This paradoxical result could only be explained by the search engine's net bias to being all inclusive and its general inability to use negative factors in narrowing results by nature of their inherent design.

Therefore, there is a need in the state of the art for an improved user directed search result strategy or interface that is user friendly, intuitive, search engine or algorithm independent, and non-intrusive and which provides the benefits of vast data search strategies while being fast, accurate, inclusive and further provides an opportunity for serendipity while allowing the user to self direct the elimination of extraneous information in both a negative context (undesirable information) and even a positive context (more desirable information). A new search enhancement or tool and interface of this type may have one or more of the following benefits:

(i) present to the user clear easy options to modify search results in order to allow the user to quickly and efficiently remove the unwanted results as well as all similar unwanted material;

(ii) improve the user's view of the wanted data by removing the "noise" created by the unwanted data;

(iii) indirectly create access to the unknown but useful information, in other words increasing the chance for serendipity, by lessening the "noise" in the result;

(iv) improve the relevance of searches and therefore increase the so called "stickiness" (the tendency to stay as a user of the engine or portal and revisit it for future searches) of a given search site. This would increase the value of the site for the various stakeholders including but not limited to the user, the search provider, the content providers including the potential revenue sources such as paid search, advertises and other content providers;

(v) allow the searcher to indirectly create and use the power of a more sophisticated Boolean type search in a user friendly intuitive way;

(vi) remove the current limits placed on these modification by providing a better operational application of the user supplied information;

(vii) allow the search engine to heuristically acquire information about information that detracts from a given search directly from the users and improve the accuracy and value of the search outcome to the individual searcher;

(viii) allow for the creation of URL based or Logged in based tracking of search detractors for a given computer or individual searcher (the logged in version would allow the prior history to "follow" the logged in user from device to device); and/or (ix) enhance the value of the search engine by "knowing" the important factors to a searcher to create value in a logged in (user identified) environment like those created when a user maintains an account or user ID with a search engine or portal.

Accordingly, described herein are various embodiments for strategies, processes, systems and interfaces which are operable to allow a search tool user better access and control over search queries and the results. The interfaces, processes and systems described herein, and the associated functionalities are search tool independent. Described herein are various examples for orders of operations search, applications of search modifying options over the current search results, options selections, application of modifications, the ability to "undo" or "redo" an applied option and the ability to repeat these sets in an iterative fashion as well as alternative ordering of the same functional operations. In accordance with some embodiments, a user may input a query through any acceptable interface, the search tool or search engine may present the search results to the user and provide a direct feedback option to the user, via which the user may indicated unwanted or undesirable search results. A goal of at least some embodiments described herein is to provide systems, methods and interfaces operable to aid a user of a search tool to remove unwanted results or "noise" efficiently. The search result modification options described herein comprise an effective means to reduce the noise and bring the more pertinent results closer to the top of the list while reducing the list sufficiently enough to allow for serendipity (as described with reference to FIG. 2 herein). The user thus should be able to enhance the possibility of viewing more pertinent data and identifying information that they were unaware of prior to the application of the user modifications. The dynamically applied negative as well as potential positive feedback created by the user feedback interfaces described herein may, in some embodiments, (i) be stored to help future user searches, and/or (ii) be tracked by a computer's location (URL) or a user login to better assist in future searches (of the same user and/or different users). In accordance with some embodiments, one or more of the user directed modifications can be added to the search engine database as it improves its own methods of searches in order to reduce "noise" or unwanted data and improve serendipity with the goal of a better user experience.

Example Processes

Figure 4:
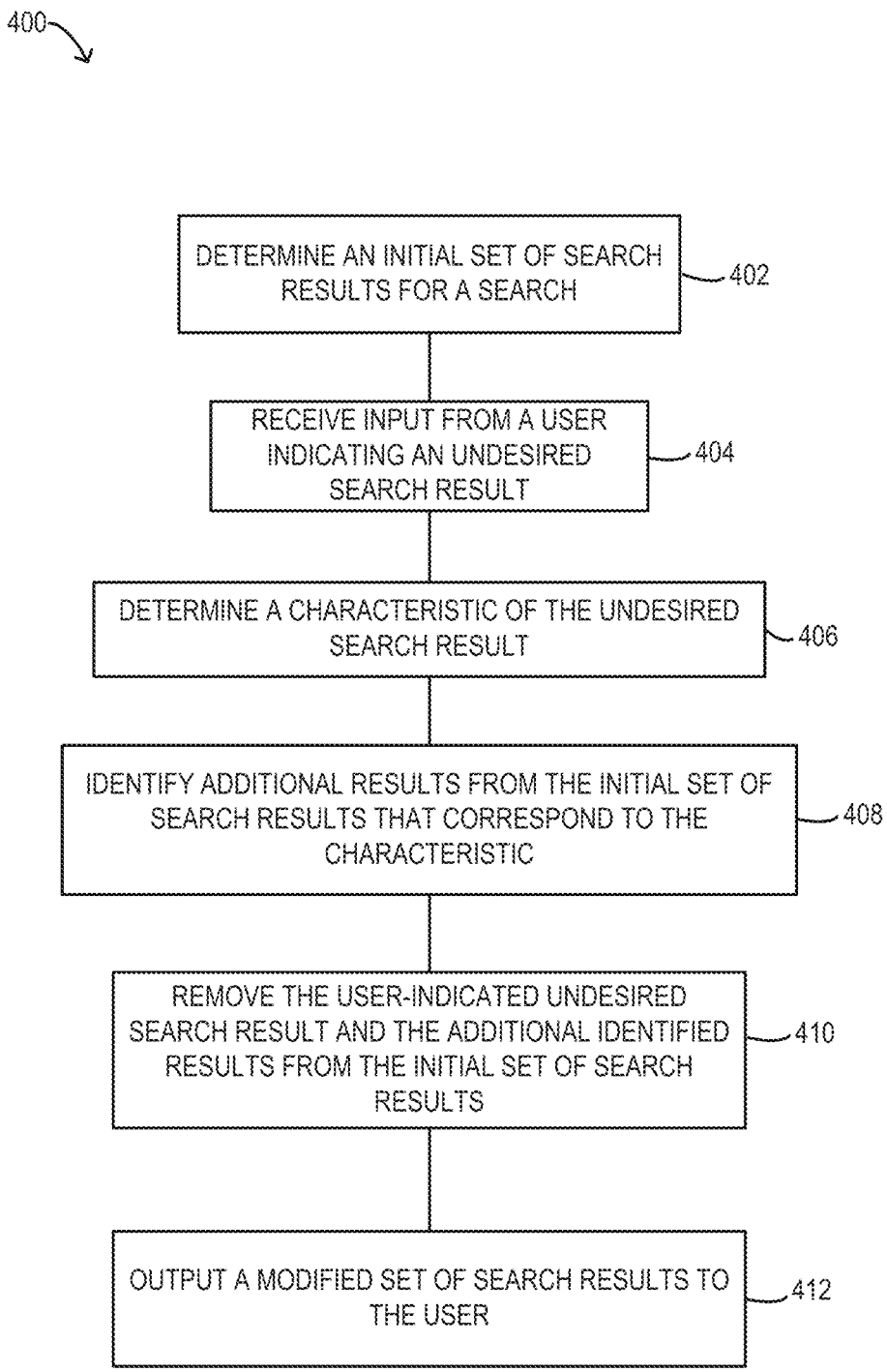
FIG. 4 is a flow diagram illustrating a process which may be performed in accordance with some embodiments described herein.

Referring now to FIG. 4, illustrated therein is a flowchart of a process 400 consistent with some embodiments described herein. It should be noted that process 400 is exemplary only and should not be construed in a limiting fashion. For example, additional and/or substitute steps to those illustrated may be practiced within the scope of the present invention and in one or more embodiments one or more steps may be omitted or modified. In one embodiment, the process 400 is performed by a search tool server 112, 114 or 116. Alternatively, process 400 may be performed by a third party server 118 and/or a software application residing on or otherwise utilized by (e.g., using cloud storage technology) a user device of a user requesting the search.

In step 402, an initial set of search results for a given search is determined. For example, if step 402 is being performed by a search tool server 112, 114 or 116, step 402 may comprise performing a search of available data based on one or more search terms and/or rules defining a search (e.g., as input by a user) and identifying the highest ranked search results for the search based on one or more algorithms. If, on the other hand, the step 402 is performed by a third party server 118 or by a software application of a user device, step 402 may comprise identifying the search results returned for a particular search by a search tool (e.g., as output via a search engine web browser interface). In either case, the step 402 may in some embodiments be preceded by a user inputting one or more search terms and/or rules defining a search into a search tool interface, which user input may initiate a search and result in an initial set of search results for the search. In one embodiment, step 402 (or an additional step preceding step 404) comprises outputting the initial set of search results to a user. For example, a listing of search results comprising hyperlinks to various web sites may be output to a user via a web browser interface.

In step 404, an input is received from the user who requested the search, the input indicating at least one undesired search result of the initial set of search results. Step 404 may, in some embodiments, be performed after the initial set of search results determined in step 402 is output to the user. Thus, the indication received in step 404 may comprise a selection of a particular one or more search results included in the initial set of search results along with an indication that the selected one or more particular search results are undesirable. In some embodiments, the selection of a result and the indication that it is undesirable may comprise the same and singular input. For example, an interface consistent with embodiments within the scope of process 400 may be output to the user, the interface allowing the user to check off, select or otherwise indicate which search results of the initial set of search results are undesirable. FIGS. 7 through 14, described below, illustrate several example interfaces which may be output to a user for allowing the user to provide an indication such as may be received in step 404.

In step 406 a characteristic of the one or more search results for which the input was received in step 404 is determined. It should be noted that more than one characteristic may be determined. Such a characteristic may, in one embodiment, be indicated (e.g., typed in, identified via a code, selected from a menu of available options) by the user who provided the indication in step 404. Alternatively, the characteristic may be determined or inferred on behalf of the user based on the indication received in step 404 (and, in some embodiments, additional information associated with the user or other users). In either case, the characteristic may be utilized in identifying what it is about the one or more search results indicated in step 404 that renders them undesirable (and thus allows a removal from the initial set of search results of not only the search result(s) indicated in step 404 but also similar, related or relevant search results).

Examples of characteristics that may be indicated, inferred or otherwise determined include, without limitation:
  (i) a source of the content or material comprising the search result (e.g., considered reliable or unreliable by the user or other users, Society web sites (like American Medical Association, ASPCA, AARP, etc), Government sources, Library of Congress), specific magazine, media channel or other content provider;
  (ii) the nature, format or medium of the search results (e.g., whether it comprises a video, one or more photos, a news articles of a web based publication or a news articles of a radio/TV or other media publication);
  (iii) country of origin or other geographical location associated with the search result;
  (iv) type face or other aesthetic characteristic;
  (v) language;
  (vi) author or publisher;
  (vii) the fact that it is a translation or version of same document already included as another search result;
  (viii) peer review journals;
  (ix) scientific;
  (x) liberal arts (any category, e.g. philosophy, music, humanities, classics, Greek mythology, roman history, etc);
  (xi) time period (e.g. before 1920, after 1800, BCE, future, past, prehistoric, inclusive dates 1969-1972, exclusive dates, not 1980 to 1990, or by decade, century or millennium)
  (xii) a characteristic of the author such as it being a single Author, multiple author, authors only with multiple publications on same or similar topic, professors, teacher of a certain institution or group of institutions (e.g., Oxford, an Ivy League school, the Big ten, etc.);
  (xiii) the fact that the search result comprises a PhD thesis;
  (xiv) the fact that the search result comprises a document or information about an IPO (Initial public offerings);
  (xv) the fact that the search result comprises an investment report;
  (xvi) the fact that the search result comprises a text book or a given text book or a text books only on a specific topic;
  (xvii) the fact that the search result comprises a lecture;
  (xviii) the fact that the search result comprises an advertisement; or
  (xix) the fact that the search result comprises theater or entertainment.

Although process 400 is illustrated as determining a characteristic of a search result indicated by the user as being undesirable, in other embodiments the process 400 (or another similar process consistent with embodiments described herein), it should be noted that the determination of the characteristic is merely one example of determining a reason for why a user considers one or more particular search results undesirable. Other mechanisms for determining a reason for why a user considers one or more search results undesirable may be utilized within the scope of the embodiments described herein. In some embodiments, the server performing the process 400 may be programmed with an algorithm enabling it to identify a characteristic of the search result indicated as undesirable or to determine a reason why a search results is (or is likely to have been) considered undesirable by a user. In some embodiments, a user may be queried as to the reason he or she considers the search result indicated in step 404 as undesirable to be undesirable.

In accordance with one embodiment, the the user may be provided with an indication or flag as to which search results were selected or preferred by other users (e.g., users within a designated group, location, set of locations, with one or more shared characteristics and/or within a class). This may be desirable in order to allow each member of a group the option to remove those results in an effort to find new or different relevant material. In some embodiments the ability to flag, identify or know other users search efforts or results can be used to emulate a physical library by monitoring or reducing access to popular information in order to force or direct deeper searches into the area of research. A more detailed discussion of processes addressing an "electronic library effect" is provided below with reference to FIG. 6.

Referring now to step 408, additional search results in the first set of search results that correspond to the characteristic determined in step 406 are identified. For example, a the remainder of the first set of search results may be analyzed to identify any additional search results that have, exhibit or are associated with the characteristic.

In step 410, the additional search result(s) identified are removed from the initial set of search results, as is the search results indicated in step 404 by the user as being undesirable. Accordingly, the initial set of search results is shortened such that it no longer includes the search result indicated by the user in step 404 or any additional search results identified in step 408.

Removing a search result from a listing of search results may, in some embodiments, comprise refreshing the listing or outputting a modified listing such that the removed search result no longer appears on the list. In some embodiments, although the removed search result itself (e.g., the hyperlink to a web page) no longer appears on the modified listing, an indication thereof may appear (and, in accordance with some embodiments, such an indication may be usable by the user to add the removed search result back to the listing of search results). In other embodiments, removing a search result may comprise hiding the search result, graying out the search result, making the search result an inactive hyperlink (in embodiments in which search results comprise hyperlinks) or otherwise altering an indicator of the search result such that it is clear to the user that the search result has been removed. In still other embodiments, removing a search result may comprise reordering or re-ranking the search results such that the undesirable search results are moved to the end of a listing of the search results.

In step 412, a modified set of search results is output to the user. The modified set being the initial set of step 402 minus the search result indicated in step 404 and minus any additional search results identified in step 408. In some embodiments, any removed search results may no longer appear on a listing of the search results comprising the modified set of search results. In other embodiments, the modified set of search results includes some indicator of the removed search results such that the user is able to add the removed search results back into the listing (e.g., by clicking on the indicator or otherwise utilizing a provided mechanism for requesting that the removed search result be added back into the listing). In some embodiments, any removed search results may be output to the user in a separate and distinct listing (e.g., a distinct web page may be created and output to the user, perhaps as a separate tab, via an interface of a web browser). In some embodiments, both the search result removed as a direct input from the user that the search result is considered undesirable is output as well as a listing of any additional search results removed as a result of step 408.

It should be noted that process 400 may be a dynamically applied process. In other words, each time a user indicates a particular search result to be undesirable (e.g., a user begins reviewing a list of initial search results and starts checking off search results the user finds undesirable as he or she goes along the list of search results), steps 406, 408 and 410 may be performed such that the list of search results is updated or refreshed dynamically as the user provides the negative feedback (e.g., the search result listing is regenerated to reflect the removal of the undesirable search results). Further, in some embodiments a user may be provided with an "undo" option such that the user may bring a search result (and any associated or corresponding search results which were removed as a result of the user previously indicating the search result as being undesirable) if the user changes his or her mind. For example, an interface of search results previously removed in the search and/or search results previously indicated by the user in the search as undesirable may be output to the user. In accordance with some embodiments, at any time during the process 400 or another process for allowing a user to indicate undesirable search results and have a search result listing modified as a result, if the user sees a desired result, the user can opt to see that result by any of the methods available for redirecting a search result to a new page (e.g., clicking, touching, mouse over or other method of page activation) or continue to be offered user directed feedback options (e.g., for indicating undesirable search results).

In an embodiment in which a list or set of search results is updated dynamically based on user feedback, the process 400 may loop back to step 404 upon outputting the modified set of search results, to determine whether another input has been received from the user, indicating another undesirable search result. If so, the process 400 may continue to steps 406, 408 and 410 as described above. In some embodiments, if an user indicates an additional search results as being undesirable after having already previously indicated in the search another search result as being undesirable, the process 400 may include a query step to determine whether the additional search result indicated by the user as undesirable has already been removed from the initial set of search results (e.g., because it corresponds to the characteristic identified in step 406 and the modified set of search results had not yet been output to the user prior to the user indicating the additional search result as being undesirable).

In some embodiments, a search listing or set of search results is only modified upon the user's request to so modify the set of search results by applying any negative or positive feedback (e.g., in the form of specific search results the user considers undesirable). In such embodiments if applied to the process 400, the steps 404-412 may only be initiated or launched upon some activation or request by the user such that multiple search results flagged or identified by the user as undesirable (e.g., each associated with a distinct characteristic or reason for being considered undesirable) are considered and applied in one application of the process and the user is provided with an output of modified search results which reflects the removal of all the search results (i) identified by the user as undesirable; and (ii) identified by the server or software application as being undesirable based on the user's indication of undesirable search results. In some embodiments, as described herein, the feature or service of modifying search results to remove undesirable search results may be embodied as a software application that is overlaid onto or run in conjunction with a search engine but that is distinct from the search engine's functionality of running an algorithm to search through available data for search results. In such embodiments which encompass the functionality of running process 400 only upon an initiation of a user (e.g., when the user determines in his discretion that he is sufficiently done with selecting undesirable search results and would like the search result listing modified to reflect his selections), the modification of the listing of search results may be initiated upon the user launching the software application or the relevant feature thereof.

It should be noted that the above-described mechanism allows for batch or group application of the user directed feedback. The same information could be provided to a designated user associated with a group (e.g., group monitor, leader, teacher, research director or other similar person) so the group work could be monitored. The users and/or monitor of the group work can use this information to reduce duplication of work or better understand the direction the project is taking. In accordance with some embodiments, the application of the new information may be tracked as the user indicates the modifications and these modifications can be dynamically undone by a specific activation by the user. A more detailed description of embodiments directed to group research projects is provided below, with respect to the "electronic library effect" embodiments.

The method of step 400 is one example of how an overwhelmingly large set of search results may be shortened to a more digestible number of search results based on a user's indication of one or more search results that the user quickly identifies as undesirable. Of course, other methods may be utilized to achieve a similar result. For example, rather than determining a characteristic of the search result indicated by the user as being undesirable and finding additional search results that correspond to or share the characteristic, a server or software application may determine a search result the user indicates is undesirable and remove additional search results that are otherwise associated with that search result. For example, the server or software application may remove additional results that were similarly indexed in a database searched in identifying the initial set of search results or that are somehow stored as related search results in the database.

In some embodiments, when a user provides feedback regarding a listing of search results (e.g., a user indicates one or more particular search results in the listing are considered undesirable), such an indication from the user may be fed back to the search tool and the search may be rerun using this user provided information. In other words, although in some embodiments a user's indication that one or more search results are undesirable may simply cause a removal of the undesirable search results (search results affirmatively indicated by the user as undesirable as well as search results determined to be undesirable based on the user's indication of the one or more particular search results) in other embodiments the user's indication that one or more search results are considered undesirable may cause a new search to be performed based on this indication(s). For example, if the user is providing the indication(s) of the one or more undesirable search results directly to a search tool, the search tool may initiate a new search of the same data (e.g., proprietary database of the search tool) previously searched upon receiving the indication(s) of the undesirable search results. In another example, if the user is providing the indication(s) of the one or more undesirable search results to a third party service or software application which utilizes the search results returned by a search tool, such third party service or software application may communicate with the search tool to request a new search based on the indication(s) from the user (e.g., the third party service or software application may generate one or more additional search terms or rules for the search tool to use in performing a new search).

It should be noted that in many embodiments it is important to the desirability of the search enhancement methods described herein that the output of the modified or second set of search results (i.e., the search results with the undesired search results removed) be done within a relatively short time frame from when the user indicates an undesired search result or characteristic of an undesired search result (or from when an initial set of search results are output, depending on the embodiment). Searchers of electronically available sources who use search tools such as search engines today are accustomed to receiving an output of search results fairly immediately upon requesting the search (e.g., usually within a second or two). Thus, enhancements such as those described herein (e.g., with respect to FIG. 4, above and FIGS. 5 and 6, below) may benefit from being performed by a processor capable of performing the methods within a very short time frame (e.g., within three or five seconds).

Figure 5:
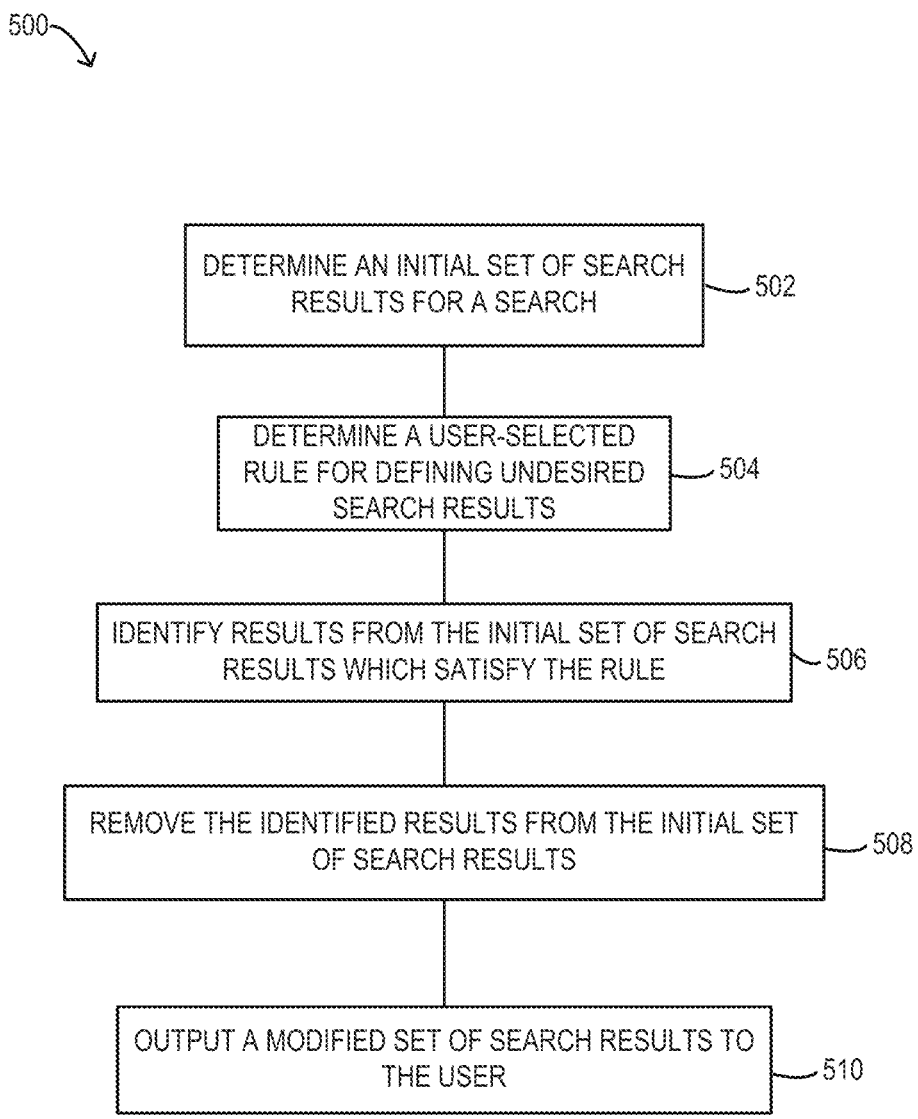
FIG. 5 is a flow diagram illustrating a process which may be performed in accordance with some embodiments described herein.

Turning now to FIG. 5, illustrated therein is yet another process for modifying a set of search results to remove undesirable search results and thus increase the likelihood of serendipity. More specifically, illustrated therein is a flowchart of a process 500 consistent with some embodiments described herein. It should be noted that process 500 is exemplary only and should not be construed in a limiting fashion. For example, additional and/or substitute steps to those illustrated may be practiced within the scope of the present invention and in one or more embodiments one or more steps may be omitted or modified. In one embodiment, the process 500 is performed by a search tool server 112, 114 or 116. Alternatively, process 500 may be performed by a third party server 118 and/or a software application residing on or otherwise utilized by (e.g., using cloud storage technology) a user device of a user requesting the search.

An initial set of search results is output to a user in step 502. This step may be similar to step 402 of process 400. Accordingly, step 502 may include and any additional or preceding processes or steps, such as receiving search terms and an initiation of search from a user as was described with respect to step 402. As indicated in step 402, in some embodiments determining an initial set of search results may also comprise outputting the initial set of search results to a user. However, it is contemplated that in many (but not all) embodiments within the scope of process 500, the initial set of search results determined in step 502 is not output to the user who requested the search. Rather, the initial set of search results may be pared down for the user before it is output in modified form, in accordance with the following steps.

In step 504 a user-selected rule for defining undesired search results is determined. For example, upon requesting a search and providing search terms to be used in conducting the search, the user may have selected or indicated one or more rules defining results or types of results the user considers undesirable. The user may have provided such an indication or selection by typing in information, making a selection from a menu of available options, or a combination thereof. For example, in some embodiments a user may be interested in viewing search results that are not the most popular search results (e.g., results that are not ranked the most highly by the search engine performing the search) or that are not ranked highly due to payments provided by a source of the search results (some search engines allow search result sources to pay in order to have their search results placed higher in a listing of search results for certain search terms). In one embodiment, a user may be provided with a menu (e.g., by a search engine provider or by a third party service provider who modifies a set an initial set of search results returned by a search engine) of available rules for defining undesirable search results. Examples of such rules include, without limitation: (i) do not output the top X most popular search results; (ii) do not output search results from source X; (iii) do not output search results associated with source X; and (iv) do not output search result which also include term X. It should be noted that the "X" term of each rule may, in some embodiments, be a "fill in the blank" type of term that the user can specify or customize by filling in a value for it or selecting one of a plurality of available values. In other embodiments the "X" term may already be specified and not customizable by the user. In some embodiments, a database of rules from which a user may select a rule for defining undesired search results may be stored (e.g., in a memory of a search engine server) and a user-friendly description or indication of each such available rule may be may be made available to any user beginning a search.

Step 504 of determining a user-selected rule may comprise identifying any rule (and, in some embodiment, particular value for a parameter of the rule that is available for customization to the user) as it had been previously selected by the user upon requesting the search. For example, a user may be allowed to select such a rule at the time of inputting the one or more search terms for a search. Thus, such a rule may be stored in a memory (e.g., a temporary memory of the user device, a search engine server, or another memory accessible to the search engine server, third party server or software application facilitating the search). In other embodiments, a user may be prompted to select a rule (if any) for defining undesired search results at another time (e.g., while the search is being performed; after the search is performed and an initial set of search results is identified, either before or after the initial set of search results it output to the user). In some embodiments, more than one rule may be selected by the user and determined in step 504. In some embodiments, one or more rules may be stored in association with a user profile and used for more than one search (e.g., the user may select such a rule and have it applied to more than one search, such that the user-selected rule is not necessarily specified by the user for the particular search whose search results are being modified in process 500).

In accordance with some embodiments, the initial set of search results may indeed be output to a user in step 502. It may be output along with a suggestion for removing one or more search results, in accordance with a rule utilized by the software application which determines such a suggestion. For example, the top five (5) search results may be flagged or otherwise indicated to a user as ones the user should consider removing. If the user accepts the suggestion (e.g., by selecting the suggested search results for removal or answering affirmatively so a query such as "Would you like the 5 search results removed from the search?"), the user's agreement to remove the search results flagged for possible removal in accordance with the rule may be considered a selection by the user of the rule. In some embodiments, search results may be suggested for removal based on a particular user's (or other users) selections of search results either for removal or further investigation, in previous searches. For example, if the user never clicks on search results comprising hyperlinks to foreign language sites, any search results which include foreign language content may be suggested for removal.

Returning now to process 500, in step 506 the search results which satisfy the rule determined in step 504 are identified. For example, if the user selected a rule which defines the top 5 most popular search results as undesirable, the top 5 most popular search results may be identified in step 506. The search results identified in step 504 as satisfying the rule are then removed from the initial set of search results in step 508. Removal of a search result from an initial list of search results may be carried out in a manner similar to that described with respect to process 400 (FIG. 4).

In step 510, a modified set of search results (one which reflects the removal of the search results performed in step 508) is output to the user. As with process 400, the outputting of a modified set of search results may be accompanied by an outputting of an indication (e.g., either on the same page or tab as the modified set of search results or on a different page or tab of a web browser) of the removed search results. A user may thus be provided with a mechanism to add one or more removed search results back into a listing of search results. Further, in some embodiments, if a user is not satisfied with what is output as the modified set of search results the user may be allowed to modify or change the rule(s) (and/or value(s) of any customizable parameter(s) thereof) used to identify and remove search results in steps 506 and 504. If the user does so modify a rule, the process 500 may be rerun beginning at step 504 in accordance with the modified or new rule(s) or value(s).

It should be appreciated that both process 400 and process 500 allows a user to efficiently remove many undesirable results from a listing of search results without needing to go through an arduous and time-consuming process of removing each undesirable search result on an individual basis. A solution which would require the user to indicate each particular search result that is undesirable and simply remove the search result the user affirmatively selects as undesirable necessarily assumes the user will review each search result. Given the breathtaking magnitude of search results many searches return (e.g., as illustrated in the example search results of FIGS. 3A-3E), it is unrealistic to assume a user would have the time or patience for such a task. As described above, a user typically becomes frustrated when faced with a large number of search results and it is the rare user who has the time to spend reviewing each search result one-by-one. Solutions such as those illustrated in process 400 and process 500 allow a user to provide feedback on a few search results (selecting a few search results as being undesirable, based on, for example, a quick perusal of search results and flagging those that quickly jump out at the user as being undesirable), or simply provide a characteristic, rule or other indicator defining an undesirable search result and thus initiate a process which removes (or determines whether it is appropriate to remove) additional search results from a listing of search results based on the user's limited negative feedback and review. For example, assume a particular search returns 1.2 million search results and a user reviews the first two pages of the search results, with twenty (20) search results being listed on each page. Further assume that the user quickly identifies six (6) of the forty (40) search results as being undesirable (e.g., in accordance with process 400). An algorithm running in accordance with process 400 or a similar process may thus review the additional 1.1+ million search results and identify an additional 150,000 search results that are also undesirable based on the user's identification of the six particular search results. That is, significantly, 150,000 search results that may be removed from a listing of the search results that the user never had to review or flag as undesirable. The removal of these search results may significantly increase the user's chances of identifying a search result the user was previously unaware of and may have missed if the 150,000 "noise" search results had not been removed for the user.

It should be understood that processes 400 and 500 are merely examples of processes which may be implemented to effectuate some embodiments described herein. Described herein are various embodiments for strategies, processes, systems and interfaces which are operable to allow a search tool user better access and control over search queries and the results. The interfaces, processes and systems described herein, and the associated functionalities are search tool independent. Described herein are various examples for orders of operations search, applications of search modifying options over the current search results, options selections, application of modifications, the ability to "undo" or "redo" an applied option and the ability to repeat these sets in an iterative fashion as well as alternative ordering of the same functional operations. In accordance with some embodiments, a user may input a query through any acceptable interface, the search engine or a third party service presents the search results and the user is presented with direct feedback options for the search results. A goal of at least some embodiments described herein is to provide systems, methods and interfaces operable to aid a user of a search tool to remove unwanted results or "noise" efficiently as opposed to enhancing, recording or using positive reinforcement as the only method of obtaining a better result. The search result modification options described herein comprise an effective means to reduce the noise and bring the more pertinent results closer to the top of the list while reducing the list sufficiently enough to allow for serendipity. The user could then view more pertinent knowledge and see information that they were unaware of prior to the application of the user modifications. The dynamically applied negative as well as potential positive feedback created by the user feedback interfaces described herein may, in some embodiments, (i) be stored to help future user searches, and/or (ii) be tracked by a computer's location (URL) or a user login to better assist in future searches (of the same user and/or different users). In accordance with some embodiments, one or more of the user directed modifications can be added to the engines data base as it improves its own methods of searches in order to reduce "noise" or unwanted data and improve serendipity with the goal of a better user experience.

Another area where the current state of the art fails to provide true depth of knowledge is what is referred to herein as "the electronic library effect." The problem addressed by the group research embodiments described herein has been recognized (but not solved) on college campuses and highlighted now in an article printed in the University of Pennsylvania's newspaper, The Weekly Pennsylvanian, on Apr. 3, 2011. The article entitled "How the Internet Killed the Creativity" with the subtitle "Relying too much on search engines limits, rather than helps, our search abilities." the author, Sarah Banks, has further emphasized this unforeseen and unsolved problem. The article quotes also Nicholas Carr's article in the Atlantic magazine in 2008 on how skimming information on the web as opposed to deeper learning is making us all less intelligent. To make her point, Ms. Banks notes that web based research is the norm on college campuses and this has had an unexpected negative effect on the papers produced by the students. She noted that when a paper on a given topic is assigned to a class, the students go directly to the web. They quickly search the topic and the modern search engines direct them to the most linked or most popular pages that match their query. The outcome of the simple application of being too good at providing these results in short order is that each student gets the same references, gains rapid access to those references and hence they all write similar papers. This is different from plagiarism but looks similar in outcome. If the students copied each others' work there would be an outrage but if the web's engines and algorithms corral them into similar results that is not fully recognized yet as a problem in learning that is need of a solution. Ms. Banks' article is evidence that even the students themselves are beginning to recognize the limits of search engines and the pitfalls within the current state of the art. This is a relatively new phenomenon and is what one could term "the electronic library effect."

"The electronic library effect" was not seen in the prior era of the physical library nor is it the expected outcome in the modern electronic library (the web) based on having the terabytes of knowledge at the students' fingertips. If we ask why this phenomenon did not happen in the conventional library system, we are pointed to two factors. First, the physical requirement of being able to take a book out and read it meant that not all the students can have the same book at the same time. The access to the same materials at the same time is entirely possible, if not extremely likely, on the web. In fact, this effect according the Banks article based on the University of Pennsylvania experience has become the rule not the exception. In contrast, in an old fashioned physical library, faced with the challenge of not being able to get the book one wanted from the library the students were forced to look at a wider group of materials. They may have had to thumb through a number of books and articles to find something of value to write about. In the physical library, serendipity was the rule not the exception. With limited access to the most popular materials, there was no "electronic library effect." The result was a wide variety of papers from one assignment. Here again is the search engine paradox. With more information available to all, there is less variety in the discoveries made by a group of independent researchers.

Applicant has identified a solution to the "electronic library effect" in some of the embodiments described herein. Applicant has recognized that there is new and unique value in the ability for researchers to affirmatively remove a very popular result (and all similar results) from a search or from a listing of search results output to researches for a given research project. The idea that removing a popular reference or result from a search to create a better if not a more interesting result while increasing serendipity is counter intuitive. Here the ability to negatively influence a search result by removing popular information actually has a net positive benefit to the user. This unexpected result, especially given the power of the current search engines, is something that is not obvious to the current users or designers of these engines and their associated algorithms. An electronic search strategy that allowed groups to be aware of, or limit, the simultaneous use of materials could, again in a counter intuitive way, decrease duplication of work, reduce the "electronic library effect" and improve the collective research effort.

At least some embodiments described herein help reduce the "electronic library effect" by allowing the user to remove a popular result from a search with the same technology and ease used to remove the unwanted results as described above with reference to individual searches. Such a feature would force a search tool to look deeper into a topic for relevance and a user would experience more serendipity by making this choice. Thus, described herein are embodiments for enhancing a group search project (a search project involving a plurality of users who are tasked with or express interest in researching a specified topic).

Accordingly, some embodiments create the ability, in a class or group of user such as students in a given class, users associated with a given location, or other defined group of users, to share in the process of selecting and deselecting one or more search results from a listing of result results. This would increase the chance that each student could discover something new. This would in turn reduce the "electronic library effect" and increase access to and the benefit of the terabytes of data on the web that current search engines are unintentionally making less available to the users today.

In accordance with one embodiment, a search engine or another component (software or hardware) operable to communicate with the search engine may be operable to track and/or record an identified user group (for example a class taking a given course or working on a particular assigned research project) and inform the students of information such as how many of their classmate have picked a reference. This allows a given student, if desired, to remove one or more references from a listing of search results returned to him or her for a search in order to more easily identify and consider what has not been picked yet. Such embodiments may create a working environment for teams working on joint research projects which allows for a reduction in duplication of effort applied during the research.

In accordance with some embodiments, the input or feedback that one or more uses of an associated group of users may provide includes but is not limiting to (i) the hit or click through count next to each search for (within) the designated research group, (ii) an identifier of each group member working on a given search result, and/or (iii) time spend on each result as a method of evaluating the current status of the project and aid in the selections or time spent on each result as the project moves forward. For example, in one embodiment a hit count indication may be provided in or next to an area of an interface for allowing the user to indicate which results are unwanted or undesirable (e.g., a red box next to each search results in accordance with one embodiment). In another example, in one embodiment a time clock indication and/or an indication of initials or researcher code number may be similarly output.

In accordance with some embodiments, a professor or other user designated as a leader, manager or controller of a group may be provided with a means of setting a value for one or more parameters defining a group search project. For example, such a group manager may be provided with a mechanism for limiting the time spent on a given reference (e.g., by a single user or by multiple users combined) and/or number of users who may view or be provided access or a link to a given reference or search result. In some embodiments, such a group manager may also be provided with a means of monitoring a research project and during the course of such a research project be allowed to adjust or change a value for one or more such parameters.

Figure 6:
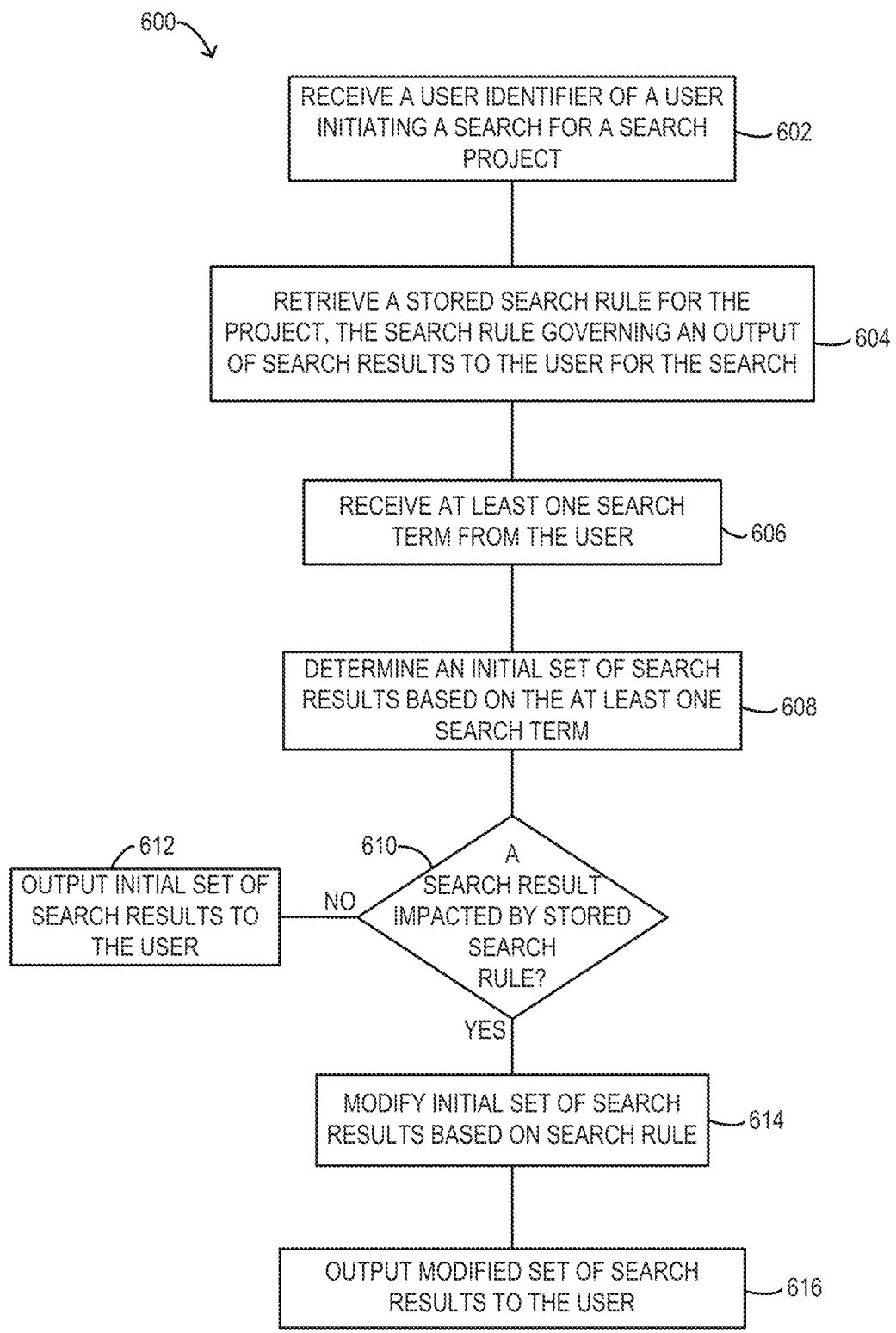
FIG. 6 is a flow diagram illustrating a process which may be performed in accordance with some embodiments described herein.

Referring now to FIG. 6, illustrated therein is a process for facilitating a research project of a group in a manner that aims to minimize the electronic library effect described herein. More specifically, illustrated therein is a flowchart of a process 600 consistent with some embodiments described herein. It should be noted that process 600 is exemplary only and should not be construed in a limiting fashion. For example, additional and/or substitute steps to those illustrated may be practiced within the scope of the present invention and in one or more embodiments one or more steps may be omitted or modified. In one embodiment, the process 500 is performed by a search tool server 112, 114 or 116. Alternatively, process 600 may be performed by a third party server 118 and/or a software application residing on or otherwise utilized by (e.g., using cloud storage technology) a user device of a user requesting the search.

A user identifier of a user initiating a search for a search or research project is received in step 602. For example, a username, a user e-mail address, a unique user identifier and/or user password may be received. In some embodiments, a research project identifier may also be received. In other embodiments, a research project identifier may be determined based on the user identifier received. For example, in some embodiments (whether process 600 is being performed by or in association with a search tool that is available to the general public (e.g., the GOOGLE search engine) or by a private search tool or on a private system or database utilizing the features described herein), a user who is a participant or member of a group research project may be able to access a web page or interface of the search tool that is designed for searches associated with registered research projects. Such an interface may provide an input mechanism for entering the user identifier and/or project identifier. A person who is a research project manager may have previously registered a research project (and, e.g., selected or been assigned a unique research project identifier for the project). In some embodiments, the project manager may have input the user identifiers of all users associated with the project. In other embodiments, association of a user with a registered research project may be dependent on a user registering himself with the research project (e.g., users can search for and select available projects to join or may have been provided a research project identifier and/or password by the project manager in order to register themselves with the project). However the association of a user identifier with a research project came about, the user identifier is utilized to retrieve from a memory (e.g., from a database of registered research projects and their associated information) a research project for which the user is initiating a search. In other embodiments, a project identifier is received in step 602 in lieu of a user identifier.

In step 604 a stored search rule associated with the research project is retrieved (e.g., from a record of a database storing information on registered research projects). The search rule comprises a rule for governing an output of search results to one or more users requesting searches for the research project. For example, a rule may define one or more search results that are to be removed from a listing of search results returned for a search based on search terms provided by the user, the removal to be applied before the listing is output to the user. In such embodiments, a such a rule may thus be thought of as a rule which defines disallowed search results for a particular research project. In another example, a rule may define information that is to be output to a user for a given search result returned to the user for a search conducted in accordance with search terms supplied by the user (e.g., a number of times a particular search result has been output to other users associated with the research project).

In some embodiments, a value may be associated with such a rule. The value may in some embodiments be a fluctuating or dynamic value that is updated based on searches performed by users associated with the project. A rule may be selected or provided for association with a particular research project by the project manager (e.g., a professor of a course). In other embodiments, one or more users may select or provide such a rule. More than one such rule may be associated with a given project. In some embodiments a rule may be applicable to all users associated with a given project. In other embodiments, a rule may be associated with only a subset (e.g., one) user of a plurality of users registered with a project. In some embodiments, a rule may be personal to a particular user such that the rule may not necessarily be associated with the project but may be associated with a particular user who is in turn associated with the project.

In one embodiment, a rule comprises at least one characteristic defining at least one search result to be removed from a set of search results output to a user of the search group other than the manager, such that any search result having the at least one characteristic is removed from a set of search results output to a user of the search group other than the manager. Another example of a rule comprises disallowing search result comprising the highest ranked search results (e.g., determined to be the most relevant to a search by a search tool using the search terms supplied by the user) or most popular search results (e.g., most popular among the users associated with the particular research project). Yet another example of a rule comprises defining a maximum number of times one or more search results is to be included in sets of search results for the search project, such that a particular search result is to be considered a disallowed search result once the particular search result appears in sets of search results for the search project the maximum number of times.

As should be understood from considering the above description of rules for governing the output of search results, some embodiments provide for the tracking of sets of search results output to users associated with a particular research project (e.g., by a search tool, third party service). Such information may be utilized to update a value of a parameter of a rule. Additionally, some embodiments provide for outputting to a user associated with a given research project an indication of information regarding searches (and search results) of other users associated with the research project. Examples of such information which may be tracked, utilized to update values of rules and/or output to users include, without limitation, for a given search result: (i) a number of instances in which the search result has been included in a set of search results output to the users of the search group; (ii) a duration of time a single user of the search group has spent reviewing a content of the search result; (iii) a total duration of time all users of the search group who had the search result output to them in a set of search results reviewing the content of the search result (e.g., an average duration based on a total number of users to whom the search result has been output in a set of search results); and (iv) a number of instances in which the search results has been selected by a user of the search group.

In step 606, at least one search term for a search of data, the search being associated with the research project, is received from the user. It should be noted that in some embodiments step 606 may be performed prior to step 604 (or even prior to step 602).

In step 608 an initial set of search results is determined based on the at least one search term received in step 606. For example, a search tool may perform a search of a database of indexed information based on the search term(s). In step 610 it is determined whether any of the search results determined in step 608 are impacted by the rule(s) determined in step 604. For example, each search result of the initial set of search results may be compared to the parameters and values of each rule associated with the research project to determine whether it satisfies or falls within the rule. If none of the search results of the initial set of search results are impacted by the rule (e.g., none of the search results are defined as disallowed search results by a rule and/or there is not tracked information to output to the user for any of the search results), the initial set of search results is output to the user without modification in step 612. Otherwise, the process 600 continues to step 614 wherein the initial set of search results is modified based on the one or more rules impacting it. For example, if one or more search results are defined as disallowed search results by an applicable rule, such disallowed search results are removed from the listing of search results. In another example, if there is information tracked and stored for a given search result (e.g., how many times the search result has been output to or selected by other users associated with the research project), such information is added to the initial set of search results (e.g., text conveying the information is added to a listing of search results, in association with the relevant search result to which it pertains). In step 616 the modified set of search results is output to the user.

Process 600 is merely one example process of how embodiments described herein may be applied to remove selected popular or wanted results (or add pertinent information regarding the popularity of wanted or popular or wanted results based on other users' activities), at the user's or project manager's discretion and direction, to reverse the so called "electronic library effect." In this way, at least some of the embodiments may facilitate a new counterintuitive strategy or method of gaining access to less accessible data. One or more embodiments specifically simplifies the process of removing results so that this unique method of indirectly improving search results by removing desirable results would be available to even the least experienced researcher.

For example, as described above, some embodiments would allow, through a login, location or common set of URLs (for a school, college or university network), a group or class of students to be made aware of the results others have used, selected or been made aware of A group and a group leader or monitor could be identified via a login embodiment. The leader or monitor could have access to the group's activity and the option to limit access to popular results as a method to encourage deeper or expanded research. This would have particular value to those trying to look deeper into a topic, experience more serendipity and find less common or more unique points of view. The strategies and processes described herein may also be applied to a group working on the same project simultaneously in order to reduce duplication of work.

Example Interfaces

Turning now to FIGS. 7 through 14, illustrated therein are various example interfaces, input mechanisms and applications useful in conjunction with any search tools (e.g., search engines or algorithms), whether currently available or yet to be designed. The interfaces and its functionalities are search tool independent. The features and functionalities described herein can be dynamically applied as the user adds information about the search in the simplest form possible (a click box). This provides the user instant feedback on the modifications, creating a new user experience. In accordance with some embodiments (e.g., the embodiment of FIG. 6), the features and functionalities described herein may also operate in a way to apply the search modifications in a group of users. Some embodiments comprise a simple interface for allowing a user to provide feedback on a search result (single click box with dynamic application). Other embodiments provide for a more complex interface for allowing a user to provide feedback on a search result (slide bar valuations and group or batch application of the user modifications). The order of operations search, application of search modifying options over the current search results, options selection, application of modifications, the ability to "undo" or "redo" an applied option and the ability to repeat these sets of steps in an iterative fashion as well as alternative sequences of the same functional operations are contemplated.

In accordance with one embodiment, the user inputs one or more search terms for a search through an available interface, the search tool presents the initial results and the user is provided with simple and easy to use user feedback options. These options are used to better define the search, reduce the unwanted results or "noise" and bring the more pertinent or desired search results closer to the top of the list. A goal is reducing the list sufficiently to allow for serendipity, the viewing of pertinent knowledge the user was unaware existed prior to the application of the user modifications. In some embodiments, the negative as well as potential positive feedback created by this novel user feedback interface may be stored to help future searches; it may be tracked by a computer's location (URL) or a user login to better assist in future searches (of the same user and/or other users). A location or group login feature could be used to allow the members of the group to have knowledge or indication of the other group members activity along with the ability to remove others' favored results in the research process to avoid duplication of results with a group or class of uses. The user directed modifications can be added to the search engines and other search tools processes as an improvement of methods of searches in order to reduce "noise" or unwanted data and improve serendipity with the goal of a better user experience.

The example embodiments of user interfaces illustrated in FIGS. 7 through 14 include one or more mechanisms for allowing a user to provide input or feedback regarding one or more search results. It should be noted that although the example interfaces and input mechanisms illustrated use graphics, text and other display mechanisms, other mechanisms are contemplated. For example, in one or more embodiments search results and/or user input or feedback on one or more search results may be exchanged via audio (e.g., a user can speak into a microphone of a device providing the search results in order to provide input or feedback on the search results).

Figure 7:
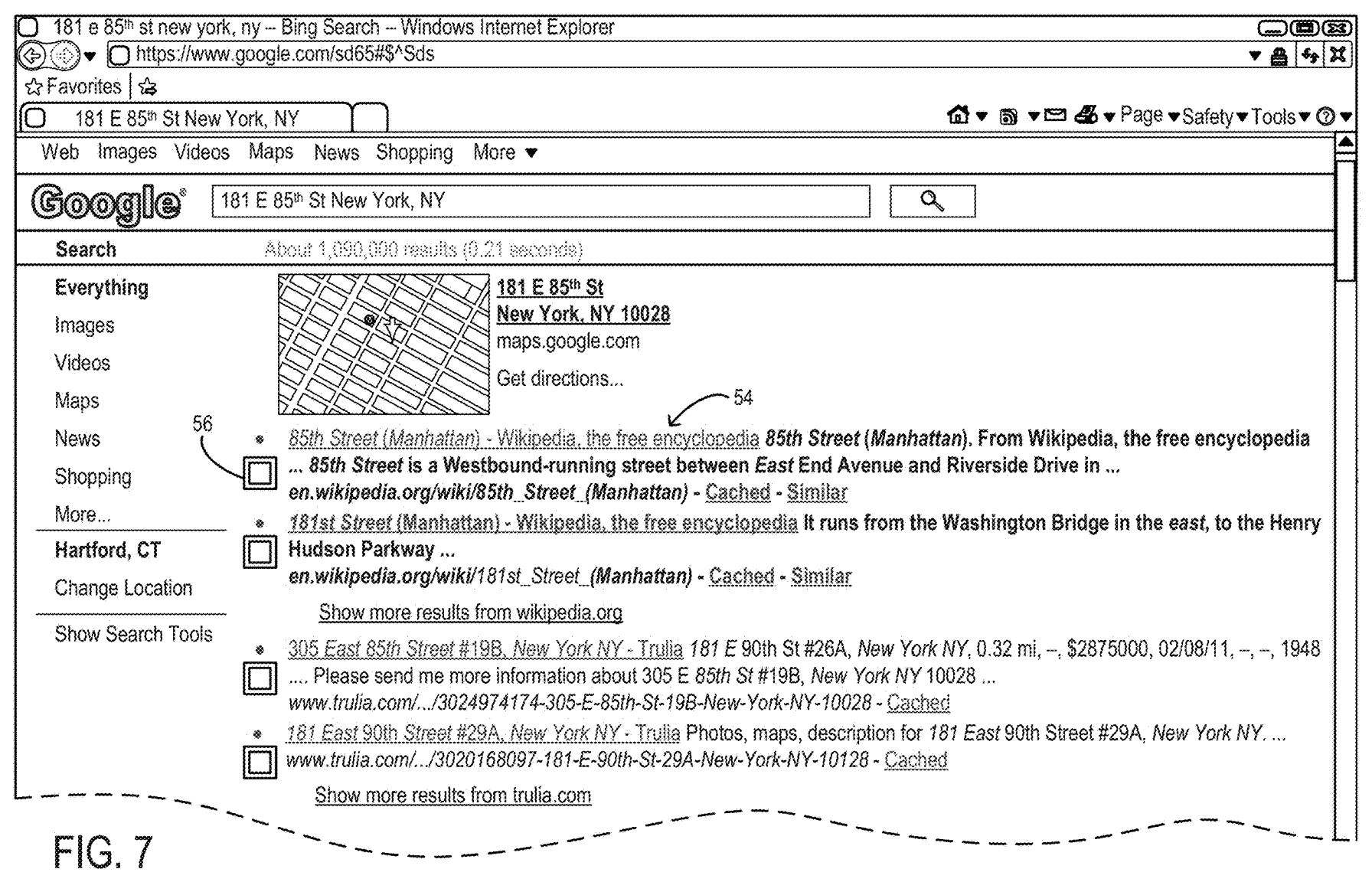
Figure 8:
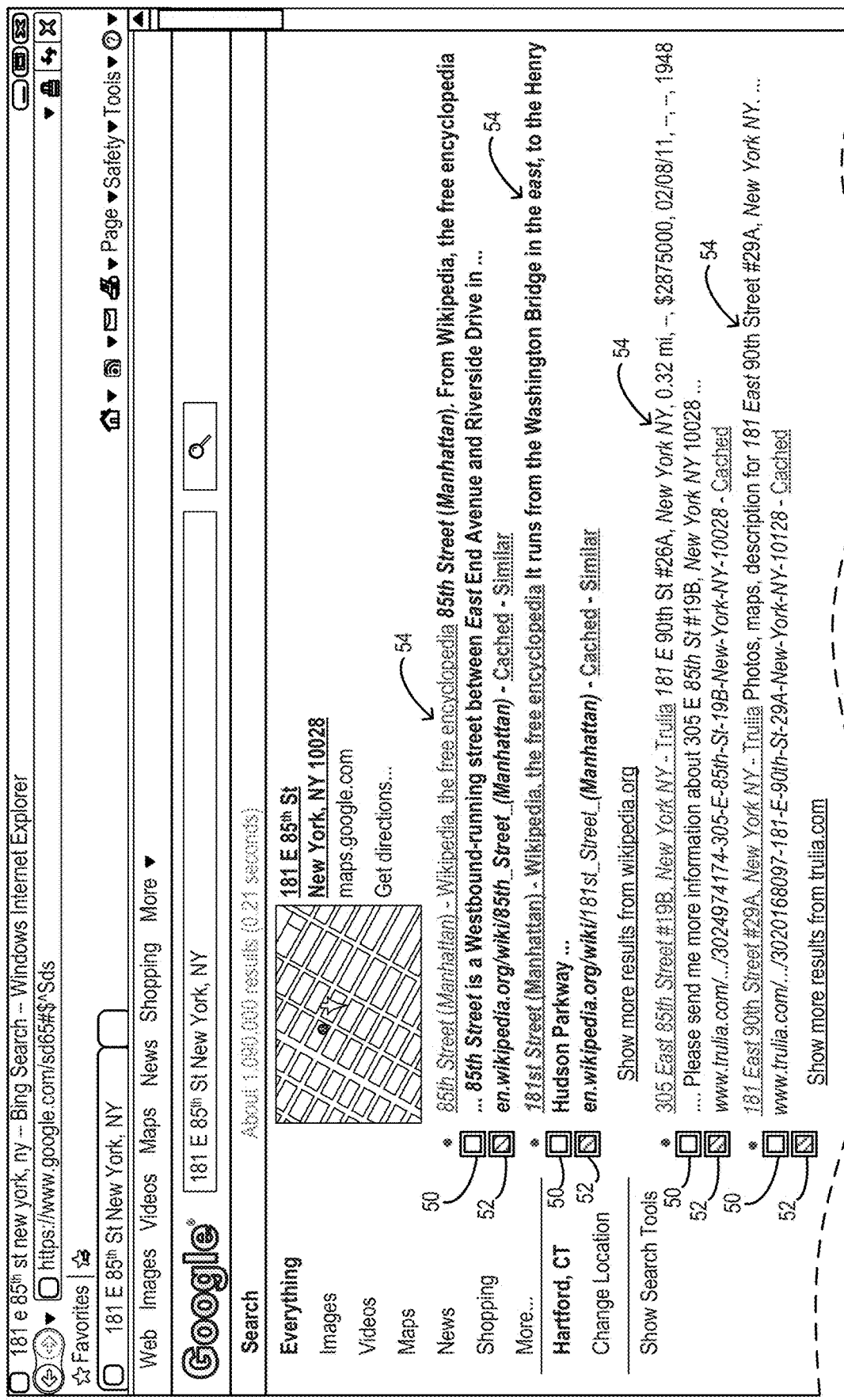
FIG. 8 is a diagram of another example interface, consistent with some embodiments described herein, via which a user to whom a set of search results is output may indicate undesirable search results to be removed from the set of search results.

Illustrated in the example embodiment of FIG. 7 is single radio button (56) input mechanism associated with each respective search result (54). The user may click the radio button on or off as desired to flag a particular search result 54 as undesirable (e.g., the search result may be flagged as undesirable by clicking the radio button on). Illustrated in FIG. 8 is an interface which provides two buttons, 50 and 52, which may in some embodiments each be in a different color or other distinct configuration, for each search result 54. For example, a green or positive button (50) may be provided for flagging an associated search result as particularly desirable and a red or negative button (52) may be provided for flagging an associated search result as undesirable. In some embodiments the input mechanisms 50 and 52 may comprise plus or minus signs or any simple indicator that relates a positive or negative feedback as the language or culture of the user dictates in order to make their purpose clear. These may be applied over or next to the search results.

Figure 9:
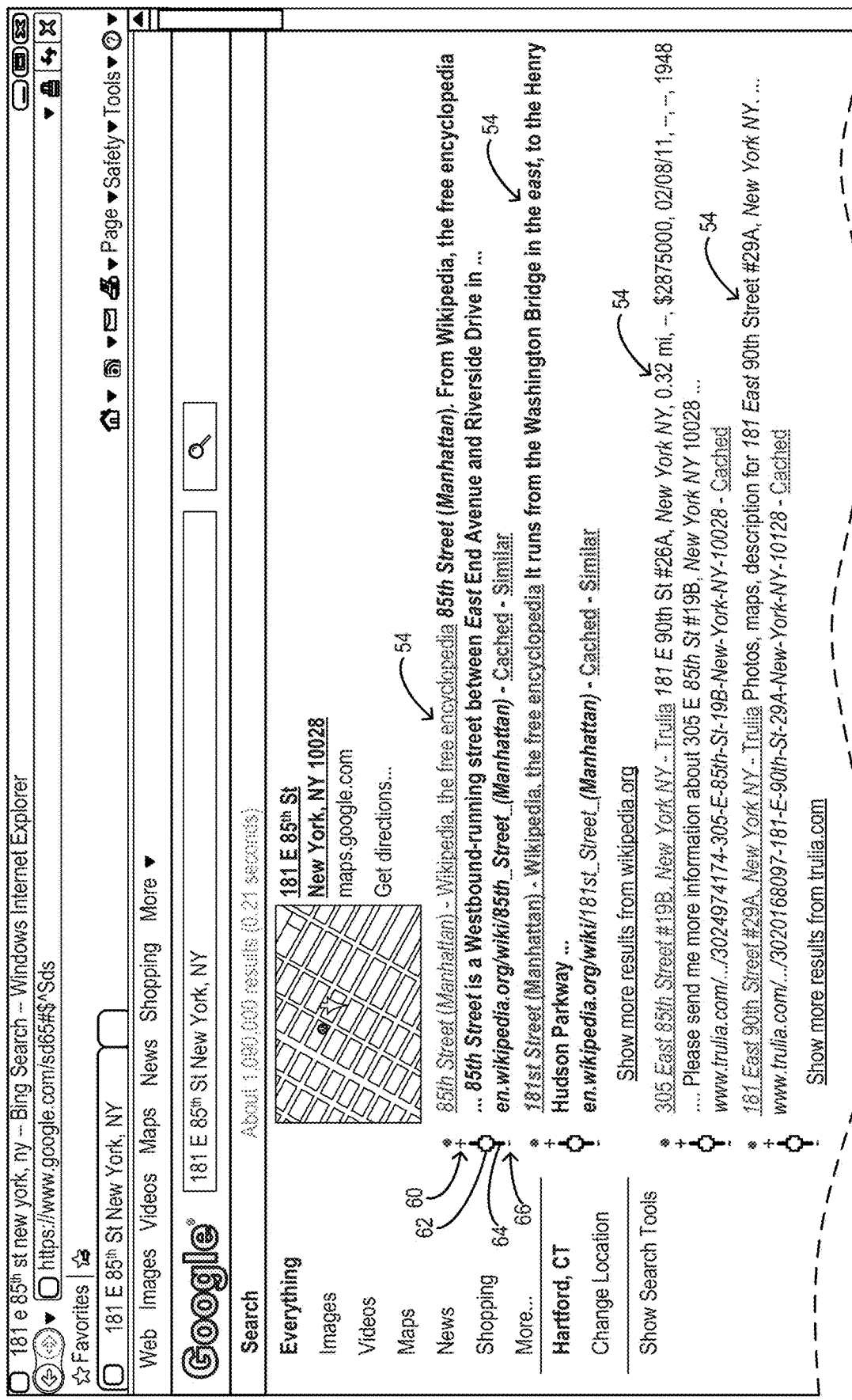
FIG. 9 is a diagram of yet another example interface, consistent with some embodiments described herein, via which a user to whom a set of search results is output may indicate undesirable search results to be removed from the set of search results.

It should be understood that embodiments contemplated are not limited to one or two button options or binary user feedback options; in some embodiments a user may be provided with a mechanism of providing input or feedback on search results that allow the user to select one of any number (e.g., a number greater than two) of feedback or input options, ratings or values for a given search result. For example, any number of buttons may be defined to add in the search definition. Illustrated in the embodiment of FIG. 9 is one embodiment in which a variable positive or negative attribute is applied to each individual search result via a slide bar (62) on a line (64). Then ends are denoted as top (+) (60) and bottom (−) (66) and could be embodied, for example, as color coded (green/red) or symbol driven as the language or culture of the user dictates. In this way the search tool can be supplied with a relative input as to the user's valuation of each of the individual search results (or for whichever search results the user desires to provide feedback).

Figure 10:
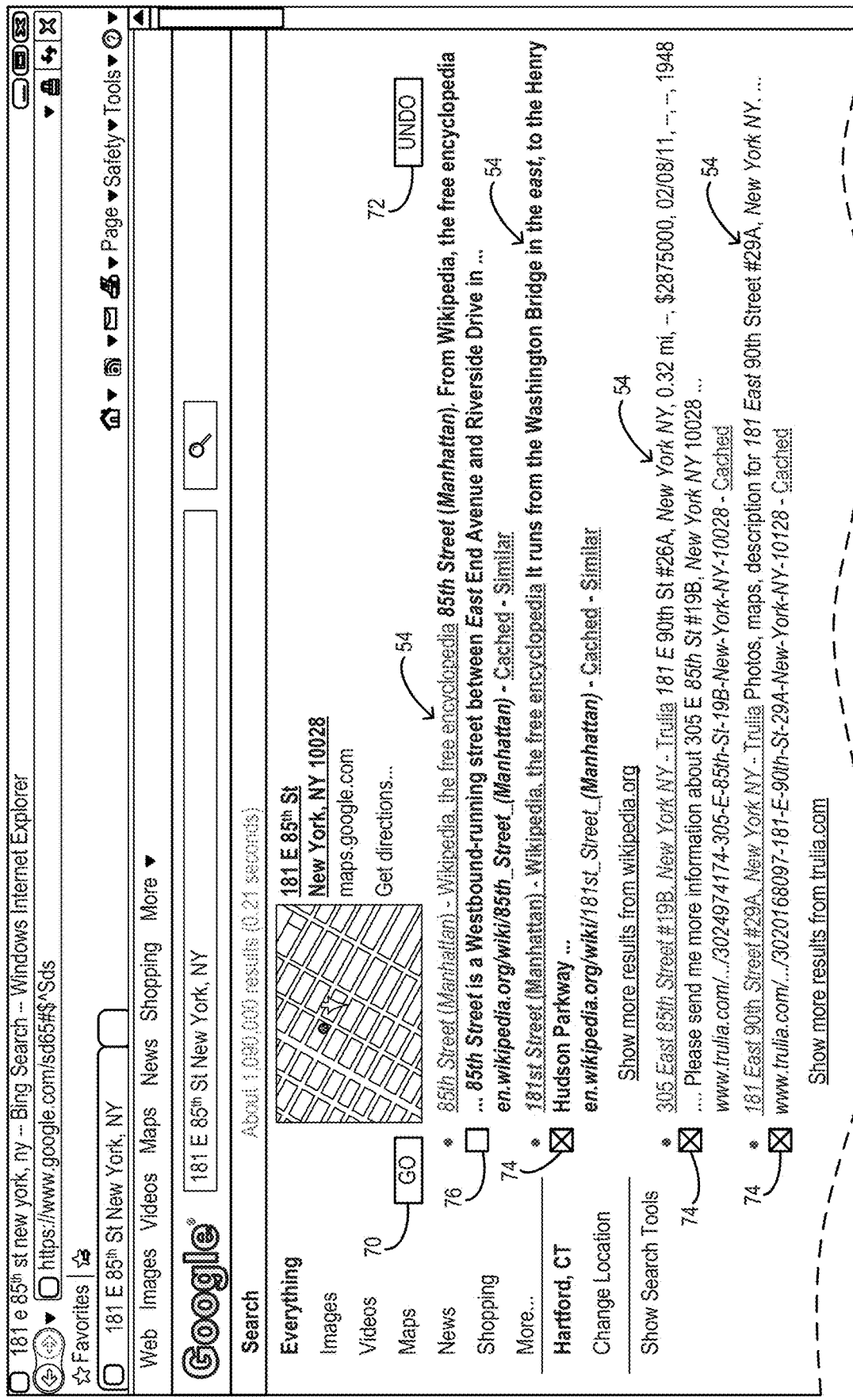
FIG. 10 is a diagram of yet another example interface, consistent with some embodiments described herein, via which a user to whom a set of search results is output may indicate undesirable search results to be removed from the set of search results.

Illustrated in the embodiment of FIG. 10 is a check or "x" box embodiment of the user feedback option with an activation method (70) as shown vi a "go" box as well as a "undo" box (72) for allowing the user to affirmatively direct the application or activation of the search result output modification features described herein. In the embodiment of FIG. 10 is also a check box nest to each search result. In one embodiment, if a user clicks or selects a check box next to a particular search result, the user is so indicating that the result is undesirable. If the user leaves the check box blank or unselected, the user indicates the associated search result is desirable. Thus, in FIG. 10, the blank or "un 'x'ed" check box 76 indicates an acceptable result and the check box with an X in it (74) indicates an undesirable search result. The reverse definition of these boxes is contemplated or other symbols (and other words such as apply or remove) as culture and language of the user should dictate the preferred communication method for this feature.

Figure 11:
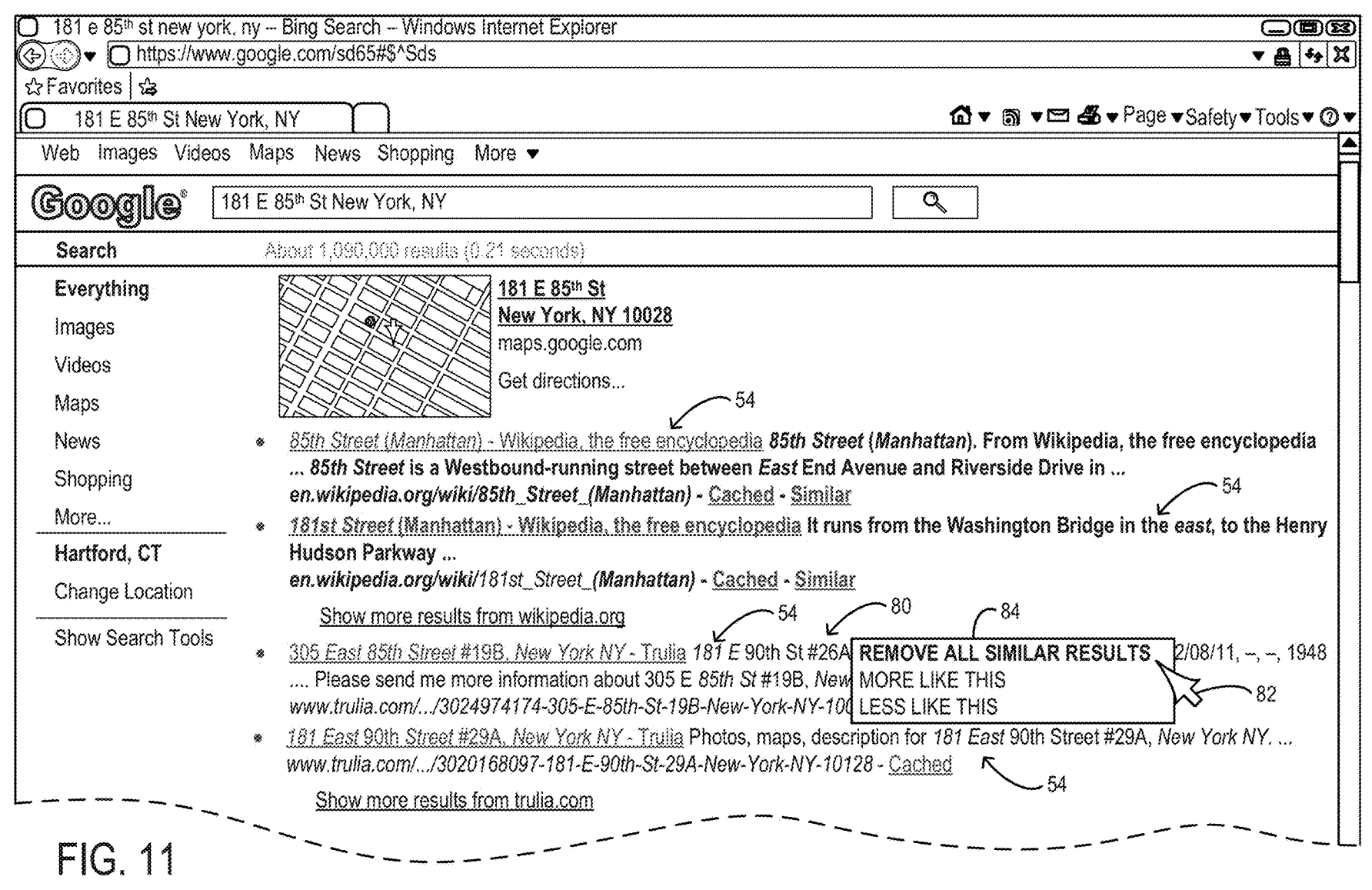

Illustrated in FIG. 11 is another embodiment in which the highlighted area (80) indicated, which may comprise a particular search result or portion thereof, may be used by a processor operable to implement one or more of the functions described herein in a positive, negative or relative way in order to modify the search by moving an arrow or other icon (82) over the desired action within a pop up type menu. In this embodiment a mouse click, double tap, multi-finger tap, control click or other differentiating selection on the highlighted area (80) opens a dialog box or drop down menu (84) containing options for the evaluation or use of the selected area in the search modification.

Figure 12:
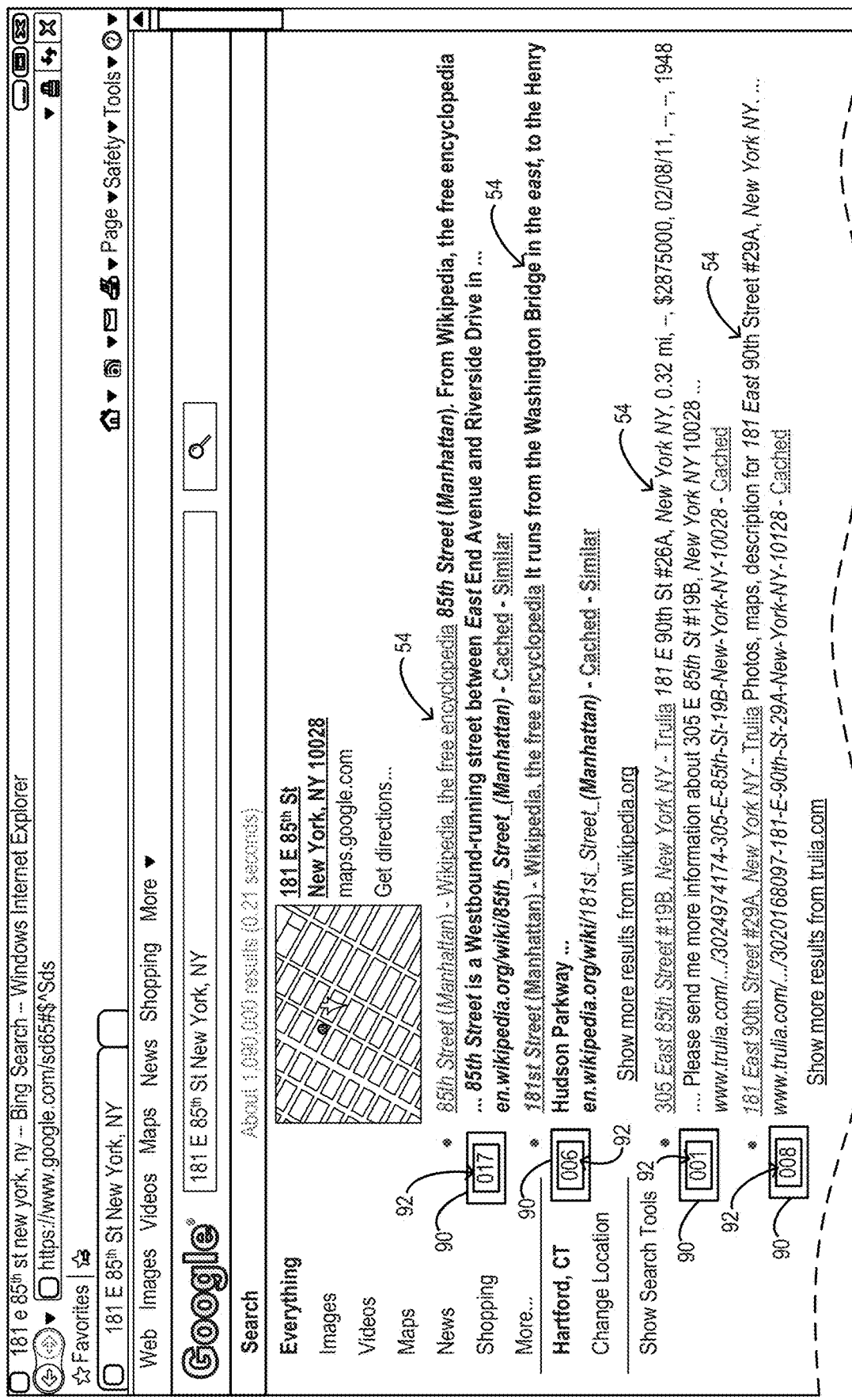
FIG. 12 is a diagram of yet another example interface, consistent with some embodiments described herein, via which a user to whom a set of search results is output may indicate undesirable search results to be removed from the set of search results.
Figure 13:
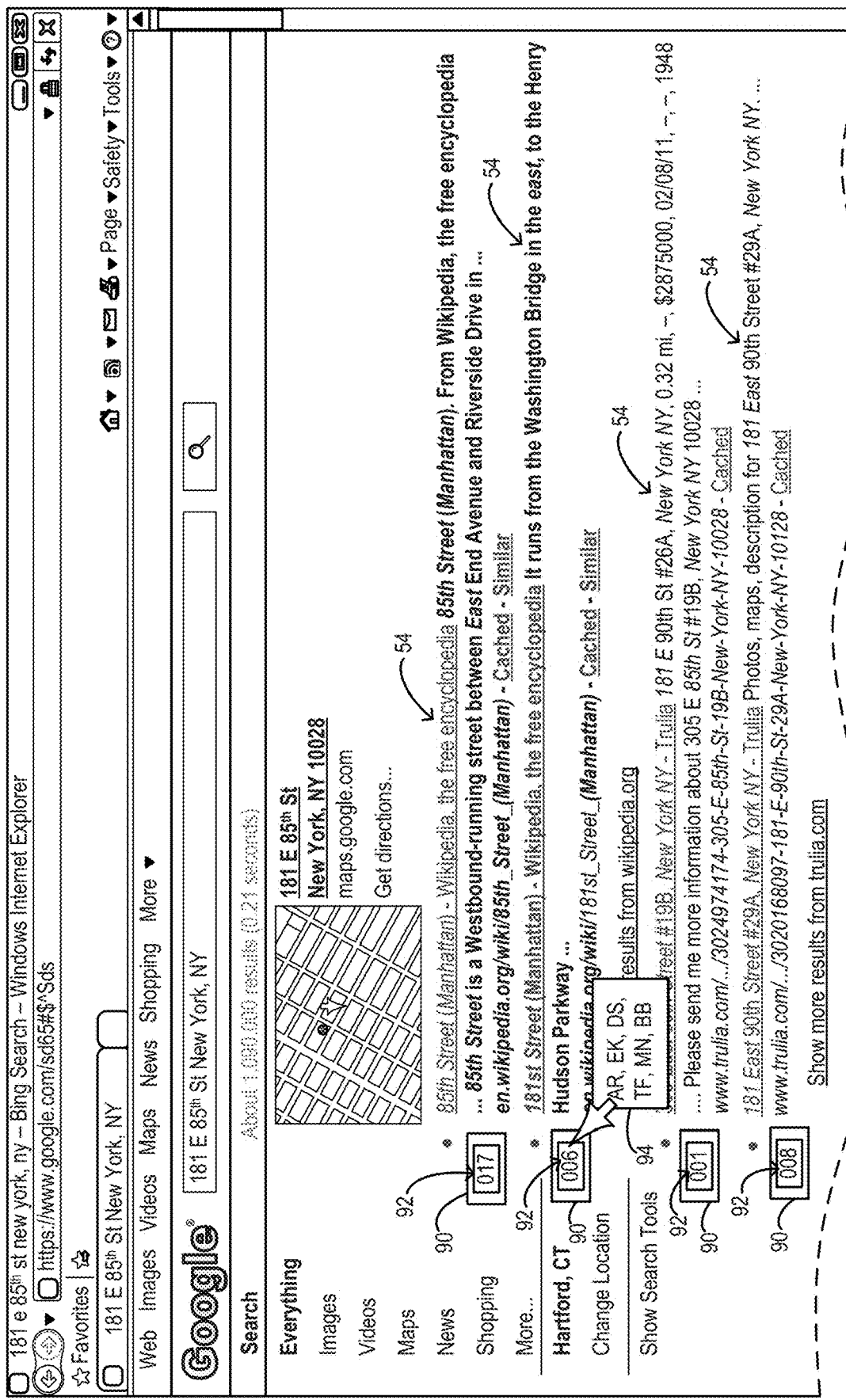
FIG. 13 is a diagram of yet another example interface, consistent with some embodiments described herein, via which a user to whom a set of search results is output may indicate undesirable search results to be removed from the set of search results.
Figure 14:
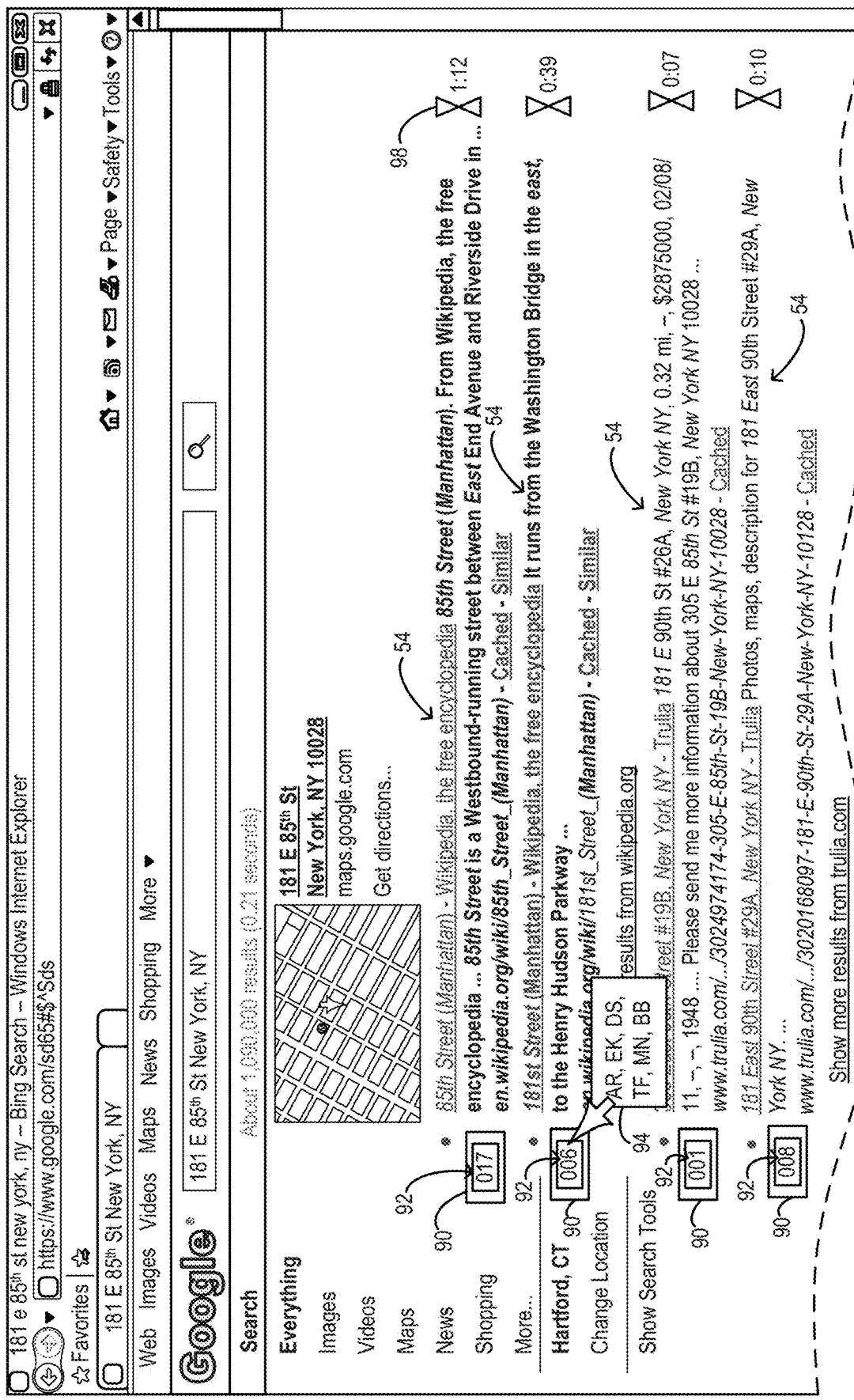
FIG. 14 is a diagram of yet another example interface, consistent with some embodiments described herein, via which a user to whom a set of search results is output may indicate undesirable search results to be removed from the set of search results.

The example interfaces illustrated in FIGS. 12-14 are directed to group research embodiments, such as the one described with reference to FIG. 6. FIG. 12 illustrates an example embodiment of user directed feedback options to search results in which a user is provided with a mechanism comprising a single button (90) associated with each search result, which button the user may click to indicate that the associated search result is undesirable. Within each button 90 is indicated a hit count (in area 92 of each button) for the associated search result as viewed by the designated user group during a search (e.g., upon review of the group manager or as an end of project summary). A hit count may comprise, for example, a number of times the search result has been output in a listing of search results to any user associated with the particular research project.

FIG. 13 illustrates another example embodiment in which user directed feedback options to search results are presented as single buttons which may be clicked on to indicate undesirable results. As in FIG. 12, within each button 90 is the hit count 92 for the search result as viewed by the designated user group during a search (e.g., upon review of the group leader or as an end of project summary). Additionally, illustrated is a mouse-over or pointer element 94 which indicates an identifier of each user of the group or associated with the research project who is also associated with the particular search result (e.g., it may indicate the initials or user identifier of each user to whom the search result was output to who selected the search result for viewing). Such an interface may allow the users associated with a particular research project or a group manager to see the activity associated with a particular search result, as well as who is working on a particular part of the project at a given time. The identifier(s) indicated in area 94 are not limited to individuals; they may comprise identifiers of a class or group or people, a team or location as part of a larger group.

FIG. 14 illustrates another example embodiment in which user directed feedback options to search results are presented as single buttons which may be clicked on to indicate undesirable results. Within each button 90 is the hit count 92 for the search result as viewed by the designated user group as viewed during a search. As in FIG. 13, there is a mouse-over or pointer function 94 for indicating user identifiers of individual users or groups of users associated with each search result. Additionally, there is provided for each search result an icon or indicator 98 for the total time spent viewing or considering a search result (which may serve as an indicator of the usefulness of the search result). For example, if a first search result has associated therewith a single hit and 8 minutes spent on it while another search result has associated therewith eight hits and only a total of 10 minutes spent on it by all viewers who considered it, this may be valuable information to a user (or project manager) as to the relative value of the information being reviewed by the group). In another example, if 6 people spent 12 minutes on one item and another item has 24 hits and a total of 3 minutes, it would imply the first reference was found to be more valuable to the group, information which may be valuable to a user reviewing a listing of search results and attempting to identify the most valuable or pertinent search results.

Of course, other interfaces for allowing a user to indicate one or more results as undesirable are within the scope of the embodiments described herein and the examples described are intended to be illustrative and non-limiting. For example, a "finger swipe" interface may be utilized in which a user "swipes away" a result he considers undesirable by using his finger to move it to the left or right (off the screen or onto a side bar of a screen).

Rules of Interpretation

Numerous embodiments have been described, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the present invention(s)" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

For example, as an example alternative to a database structure for storing information, a hierarchical electronic file folder structure may be used. A program may then be used to access the appropriate information in an appropriate file folder in the hierarchy based on a file path named in the program.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

CONCLUSION

While various embodiments have been described herein, it should be understood that the scope of the present invention is not limited to the particular embodiments explicitly described. Many other variations and embodiments would be understood by one of ordinary skill in the art upon reading the present description.

What is claimed is:

1. A non-transitory computer-readable medium storing instructions for directing a processor to modify an output of search results output via a Graphical User Interface (GUI) of a computing device, the instructions when executed by the processor causing the processor to:

(a) generate, by the processor based on information stored in a database and in response to a request for a listing of search results from a user, a first plurality of search results, the first plurality of search results being ordered in a first sequence;

(b) output, by the processor as a response to the request, via the GUI and to the user, the first plurality of search results as ordered in the first sequence;

(c) receive, from the user and via an input mechanism of the GUI, at least one input, the at least one input indicating at least one search result of the first plurality of search results that the user has identified as unwanted and which have insufficient current value to the user;

(d) analyze the first plurality of search results in view of the at least one input and automatically modify the first plurality of search results by the processor, based on the at least one input and data generated by the processor, after the first plurality of search results has been output to the user, thereby generating a second plurality of search results by:

(i) determining a first characteristic of the at least one search result of the plurality of search results that the user has indicated as unwanted, thereby determining at least one unwanted characteristic;

(ii) identifying any additional search results in the first plurality of search results which also correspond to the unwanted characteristic and for which the user has not provided an input to identify them as unwanted, thereby determining inferred unwanted search results; and (iii) dynamically reordering the first plurality of search results based on the identification of the inferred unwanted search results and the at least one search result for which input was received from the user; and (e) output, as an updated response to the request, the second plurality of search results to the user via the GUI.

2. The non-transitory computer-readable medium of claim 1, wherein the at least one input indicating at least one search result of the first plurality of search results that the user has indicated as unwanted comprises an input which causes a removal of the at least one search result from the first plurality of search results prior to step (d) of modifying the first plurality of search results.

3. The non-transitory computer-readable medium of claim 2, wherein the instructions further cause the processor to output to the user, via the display of the mobile device, a mechanism for adding a removed search result back into the first plurality of search results.

4. The non-transitory computer-readable medium of claim 1, wherein step (d) further comprises removing any search result of the first plurality of search results that the user has indicated as unwanted, thereby determining at least one removed search result.

5. The non-transitory computer-readable medium of claim 1, wherein the processor and the database comprise components of a server remote from the mobile device.

6. The non-transitory computer-readable medium of claim 1, wherein the processor comprises a processor of the mobile device.

7. The non-transitory computer-readable medium of claim 1, wherein the instructions causing the processor to generate the first plurality of search results cause the processor to determine login information for the user and to generate the first plurality of search results based at least on data associated with the login information.

8. The non-transitory computer-readable medium of claim 1, wherein the instructions cause the processor to modify the first plurality of search results in response to a second input to the mobile device from the user, the second input comprising a request for a modification of the first plurality of search results.

9. The non-transitory computer-readable medium of claim 1, wherein the first plurality of search results comprise results of a search requested by the user.

10. The non-transitory computer-readable medium of claim 1, wherein an input comprises a selection of a first indicator corresponding to the first unwanted search result.

11. The non-transitory computer-readable medium of claim 1, wherein the at least one input indicating the at least one search result of the first plurality of search results that the user has indicated as unwanted comprises a selection of an indicator available via a display of the mobile device.

12. The non-transitory computer-readable medium of claim 11, wherein the indicator is associated with a red color.

13. The non-transitory computer-readable medium of claim 1, wherein the input from the user does not explicitly identify the first characteristic.

14. The non-transitory computer-readable medium of claim 1, wherein identifying the unwanted characteristic in (d) comprises:
    identifying a plurality of characteristics corresponding to the at least search result the user has indicated as unwanted; and
    selecting one of the plurality of characteristics as one of the unwanted characteristic.

15. The non-transitory computer-readable medium of claim 14, further comprising:
    outputting to the user the plurality of characteristics; and
    wherein selecting comprises selecting one of the plurality of characteristics based on a response from the user to the plurality of characteristics output to the user.

16. The non-transitory computer-readable medium of claim 1, wherein the unwanted characteristic in (d) comprises a category of the at least one search result the user has indicated as unwanted.

17. A computing device, the computing device comprising:
    a processor;
    a display outputting a Graphical User Interface (GUI);
    a user-selectable input device; and
    a memory storing a program for controlling the processor the program when executed by the processor causing the processor to:
    (a) generate, by the processor based on information stored in a database and in response to a request for a listing of search results from a user, a first plurality of search results, the first plurality of search results being ordered in a first sequence;
    (b) output, by the processor as a response to the request, via the GUI and to the user, the first plurality of search results as ordered in the first sequence;
    (c) receive, from the user and via an input mechanism of the GUI, at least one input, the at least one input indicating at least one search result of the first plurality of search results that the user has identified as unwanted and which have insufficient current value to the user;
    (d) analyze the first plurality of search results in view of the at least one input and automatically modify the first plurality of search results by the processor, based on the at least one input and data generated by the processor, after the first plurality of search results has been output to the user, thereby generating a second plurality of search results by:
        (i) determining a first characteristic of the at least one search result of the plurality of search results that the user has indicated as unwanted, thereby determining at least one unwanted characteristic;

(ii) identifying any additional search results in the first plurality of search results which also correspond to the unwanted characteristic and for which the user has not provided an input to identify them as unwanted, thereby determining inferred unwanted search results; and (iii) dynamically reordering the first plurality of search results based on the identification of the inferred unwanted search results and the at least one search result for which input was received from the user; and (e) output, as an updated response to the request, the second plurality of search results to the user via the GUI.

18. The mobile device of claim 17, wherein the at least one input indicating at least one search result of the first plurality of search results that the user has indicated as unwanted comprises an input which causes a removal of the at least one search result from the first plurality of search results prior to step (d) of modifying the first plurality of search results.

19. The mobile device of claim 17, wherein (d) further comprises removing any search result of the first plurality of search results that the user has indicated as unwanted, thereby determining at least one removed search result.

* * * * *